(12) United States Patent
Schmidt

(10) Patent No.: US 8,047,836 B2
(45) Date of Patent: Nov. 1, 2011

(54) NOZZLE VALVE GATE APPARATUS WITH WIPER SEAL

(75) Inventor: Harald Schmidt, Georgetown (CA)

(73) Assignee: Mold Hotrunner Solutions Inc., Georgetown, CA (US)

( * ) Notice: Subject to any disclaimer, the term of this patent is extended or adjusted under 35 U.S.C. 154(b) by 30 days.

(21) Appl. No.: 12/755,164

(22) Filed: Apr. 6, 2010

(65) Prior Publication Data
US 2011/0244070 A1    Oct. 6, 2011

(51) Int. Cl.
B29C 45/23    (2006.01)
(52) U.S. Cl. .................................. 425/564; 425/566
(58) Field of Classification Search .............. 425/562, 425/563, 564, 565, 566
See application file for complete search history.

(56) References Cited

U.S. PATENT DOCUMENTS

| | | | |
|---|---|---|---|
| 4,013,393 A | 3/1977 | Gellert | |
| 4,026,518 A | 5/1977 | Gellert | |
| 4,053,271 A * | 10/1977 | Gellert | 425/562 |
| 4,740,151 A | 4/1988 | Schmidt et al. | |
| 4,917,594 A | 4/1990 | Gellert | |
| 4,919,606 A | 4/1990 | Gellert | |
| 4,979,892 A | 12/1990 | Gellert | |
| 5,288,225 A | 2/1994 | Schmidt et al. | |
| 5,334,010 A * | 8/1994 | Teng | 425/563 |
| 5,478,230 A | 12/1995 | McGrevy | |
| 5,511,968 A | 4/1996 | Guzzini et al. | |
| 5,518,393 A | 5/1996 | Gessner | |
| 5,533,882 A | 7/1996 | Gessner et al. | |
| 5,635,227 A | 6/1997 | Whisenhunt et al. | |
| 5,855,934 A | 1/1999 | Rozema et al. | |
| 5,916,605 A | 6/1999 | Swenson et al. | |
| 5,948,448 A | 9/1999 | Schmidt | |
| 6,062,840 A | 5/2000 | Lee et al. | |
| 6,159,000 A | 12/2000 | Puri et al. | |
| 6,183,239 B1 | 2/2001 | Belous | |
| 6,261,075 B1 | 7/2001 | Lee et al. | |
| 6,343,925 B1 | 2/2002 | Jenko | |
| 6,575,731 B1 | 6/2003 | Olaru et al. | |
| 6,755,641 B1 | 6/2004 | Nakaniski | |
| 7,086,852 B2 | 8/2006 | Nakaniski | |
| 2004/0109914 A1 | 6/2004 | Tabassi | |
| 2005/0233028 A1 | 10/2005 | Ciccone | |
| 2007/0237852 A1 | 10/2007 | Martino et al. | |

(Continued)

OTHER PUBLICATIONS

Brochure entitled "Extensions of Product Range/Universal Needle Valve" by Hasco dated Oct. 2008.

(Continued)

Primary Examiner — Timothy Heitbrink
(74) Attorney, Agent, or Firm — McMillan LLP

(57) ABSTRACT

A nozzle valve gate for injecting hot plastics into an injection mold includes a body having a passage for flow of the plastics to an outlet and forming an actuator chamber. A nozzle part is connected to the body and extends longitudinally to a nozzle tip having an injection aperture. The nozzle part has a flow passageway connected to the plastics outlet for conducting the plastics melt to the injection aperture and a machined bore forming a guide passageway. A valve pin is movable in the guide passageway between open and closed positions. A piston is connected to the pin and is slidable in the actuator chamber. An elastomeric wiper seal extends around the valve pin adjacent the machined bore, is wear resistant, and can withstand high temperatures of at least 200° C. A micro gap is formed between the pin and the machined bore.

28 Claims, 15 Drawing Sheets

U.S. PATENT DOCUMENTS

2009/0159828 A1 6/2009 Esser
2009/0256282 A1 10/2009 Olaru et al.
2011/0129561 A1* 6/2011 Adas et al. .................. 425/564

OTHER PUBLICATIONS

Press Release entitled "Evolution in Stack Molds" by Thermoplay undated 2007.
Brochure entitled "Ewikon Hotrunner Systems/Product Guide" published by Ewikon Heisskanalysysteme GmbH & Co. KG in Oct. 2005.
Innovation in Valve Gate Technology, published by Gunther Hot Runner Systems, Inc. (undated).
Brochure entitled "Mold Hotrunner Solutions" published by Mold Hotrunner Solutions Inc. in 2006.
"Front Mounted Valve Gates" leaflet published by Husky Injection Molding Systems in Jun. 1997.
Brochure entitled "Master-Shot Dusen" published by Mold-Masters Limited apparently published in 1985.
Brochure entitled "Mold-Masters System V 13 Immediate Delivery" published by Mold-Masters Limited 1979.
Leaflet entitled "Precision Seriers Valve Gate" published by Fastheat, undated.
Brochure entitled "Injection Molding With Modular Hot Runner Systems" published by Mold-Masters Limited 1987.
Leaflet entitled "Thermoject Integral/Big Shot" published by Plastic Service GmbH (undated).
Leaflet entitled "1250 Series Nozzles" published by Husky Injection Molding Systems Inc. 1997.
Brochure entitled System V12. "Single and V14 Single" published by Mold-Masters Limited apparently published in 1984.
Leaflet entitled "Hot Runner Nozzles" published by ProTool AG, Euro mould 2008.
Brochure entitled ". . . the million maker" published by Otto Manner GmbH, (undated).
Article entitled "Hot Shots, New Nozzles and Controls Add Sizzle to Runnerless Molding" printed Nov. 2006, www.ptonline.com.
Brochure entitled "For the Big Shot" published by Mold-Masters Limited 1986.
Brochure entitled "230 V-24 V-5V" published by Gunther Heisskanaltechnik (undated).
Brochure entitled "Electrical needle drive unit for valve gate systems" published by Ewikon Heisskanalysysteme GmbH & Co. KG in Jun. 2006.
Article entitled "New Thermal & Valve-Gate Nozzles and Controller" by mastip.com, in Plastics Technology May 2008.
Brochure entitled "Hot-Runner Systems Technology, Quality and Efficiency without Compromise" published by Otto Manner Heisskanalsysteme GmbH (undated).
Brochure entitled "Ewikon valve gate technology" published by Ewikon Hotrunner Systems of America Inc. Jun. 2006.
Leaflet entitled "E-mag-v valve with E-mag Control-v" published by PSG Plastic Service GmbH Oct 2007.
Brochure entitled "Packing Hotrunners" published by Mold Hotrunner Solutions Inc. Jul. 2002.
Brochure entitled "Mold Hotrunner Solutions" published by Mold Hotrunnder Solutions 2009.
Brochure entitled "Tradesco" published by Tradesco, undated.
Brochure entitled Polyimide—Direct Formable Thermosetting Materials; Meldin 7000 Series, published by Saint-Gobain Performance Plastics Corporation in 2008.
Brochure entitled Plavis Polyimide Specifications, published by Bordeker Plastics, Inc. in 2010.

\* cited by examiner

US 8,047,836 B2

NOZZLE VALVE GATE APPARATUS WITH WIPER SEAL

This invention relates to nozzle valve gate apparatus for injecting hot plastics material into an injection mold for molding plastic products or parts and also to hotrunner systems for injecting plastics material into an injection mold.

BACKGROUND OF THE INVENTION

Similar plastic parts are commonly produced in injection molds with single or multiple cavities. In the case of an injection molding machine wherein the mold has multiple cavities, it is known to use a hotrunner system to deliver the hot plastics material or melt from a melt plastification barrel of the machine to the cavities in the mold. The hotrunner system provides the plastic melt at a defined melt pressure and a controlled melt temperature to each mold cavity. In order to accomplish this objective, the hotrunner system commonly employs a heated manifold through which melt conduits extend and heated injection nozzles.

Nozzle valve gates are used in the aforementioned melt distribution systems to control the opening and closing of gate orifices, that is, the orifices that open into each mold cavity and through which the melt is delivered. The valve gate is a positive shut off device that has an open and closed position. At the beginning of melt injection, a valve pin of the valve gate opens the orifice in order to allow the plastic melt to fill the adjacent cavity. In addition, after the cavity has been filled, the gate orifice remains open during a packing phase which relies on packing pressure to control the quality of the plastic part. While the thermoplastic melt starts to solidify during the packing phase, the valve gate closes the orifice to achieve a clean gate mark on the plastic part surface and to avoid stringing or drooling of melt through the gate from the hotrunner system while the mold opens for part injection.

A melt channel or passage is formed in the nozzle of the valve gate to deliver the hot plastics melt to the gate orifice. Movement of the valve pin inside this melt channel is generally an open and closed stroke in the axial or longitudinal direction of the nozzle. The valve pin is actuated between open and closed positions by means of a valve actuator that is connected to a rear end of the valve pin. With known hotrunner systems, the valve actuator is commonly located externally of the heated components of the hotrunner system (for example, the manifold) because the commonly used valve actuators are not functional at the usual melt processing temperature of thermoplastics materials which is between 200 and 450° C. Generally pneumatic and hydraulic valve actuators are provided with seals between the pistons and their respective cylinders that operate only below 200° C. Also, electromechanic actuators require a low ambient temperature of less than 200° C. It will be understood that a heated melt distribution system or hotrunner system inside a valve gate mold can, depending on the location of the actuators, affect the valve actuators by heat conductivity, radiation and convection. Because of this effect, valve actuators are commonly positioned at a sufficient distance from the heated surface of the melt distribution manifold and the injection nozzle to keep them within their operating temperature range, which is preferably below 100° C. Known valve pin actuators can be physically separated from the heated manifold and the injection nozzle or nozzles by various means which allow the actuators to be located in a remote location where the actuator temperature can be maintained below 100° C. In addition to this thermal separation from the hotrunner manifold and the nozzles, it is known to provide for direct or indirect cooling of the actuators. Thus a cooling circuit within the injection mold can be directly or indirectly connected with the actuator to withdraw heat from the actuator.

It is also known to provide injection molds with a high number of cavities for making small plastic parts and it is advantageous to make such a mold as compact as possible. However, it is difficult and costly to integrate valve actuators with an effective cooling system in a compact mold of this type. Generally, valve pin actuators require considerable space inside an injection mold and they can add to the overall stack height of the mold. Moreover, forming cutout spaces for the actuators and bores or cutouts for cooling lines as well as air, hydraulic, or electric lines weakens the mold plate structure that has to support the substantial forces of the melt injection pressure inside the mold cavities and the clamping force in the molding machine.

U.S. Pat. No. 5,948,448 issued Sep. 7, 1999 to Eurotool, Inc., describes a hotrunner system for injecting hot plastics material into an injection mold that includes a thermally insulated manifold with a plastics flow channel extending therethrough to a nozzle part. An elongated valve pin extends through the manifold and through the nozzle and it is adapted to open or close an injection aperture. The head of the pin is connected to an actuator located above the manifold and on the side thereof opposite the nozzle member. The valve pin is slidably mounted in an aperture formed in a valve seal bushing which is screwable fixed within a complementary bore in a top surface of the manifold.

U.S. Pat. No. 6,159,000 issued Dec. 12, 2000 to Husky Injection Molding Systems Ltd. describes a hotrunner valve gated injection molding device which directs melt from a melt channel to a melt cavity. A guide sleeve is positioned at the gate end of the nozzle body and surrounds a valve stem in order to guide the valve stem inside the guide sleeve and to provide a sealing device at the gate end of the nozzle body. In this known system, the actuator for the valve pin is mounted in a valve plate through which the nozzle body extends and that is separate from the hotrunner manifold. The guide sleeve at the forward end of the nozzle assembly may be made of any high resistant tool steel and can be a nickel/chrome tool steel with a gas nitriding surface treatment to harden the surface, or a tool steel having hard wearing properties. There can be a close tolerance sliding engagement of the valve stem inside the guide sleeve which is said to inhibit leaking of plastic melt through the bore in the sleeve.

There is disclosed herein a novel valve gate apparatus for delivering and injecting hot plastics material into an injection mold. This valve gate is provided with an elastomeric wiper seal extending around and engaging the valve pin adjacent a machined guide bore. This wiper seal is made of a wear resistant material and is capable of withstanding operating temperatures for the valve gate apparatus of at least 200° C.

SUMMARY OF THE DISCLOSURE

According to one embodiment of the present disclosure a nozzle valve gate apparatus for delivering and injecting hot plastics material into an injection mold for molding a plastics product or part includes a chamber forming body having a first passage arrangement for flow of the hot plastics material from a plastics inlet to at least one plastics outlet. This body forms an actuator chamber. A nozzle part is connected to the body and has a longitudinal axis. This nozzle part extends in the longitudinal direction to a nozzle tip having an injection aperture for the hot plastics material to flow into the injection mold. The nozzle part forms a second passage arrangement operably connected to the at least one plastics outlet for conducting the hot plastics material to the injection aperture and forms a longitudinal guide passage comprising a machined bore. A valve pin extends through the guide passage and is movable therein in the longitudinal direction between an open position at which the hot plastics material can flow through the injection aperture and a closed position which stops flow of the plastics material through the injection aperture. A piston is connected to the valve pin, is slidably mounted in the actuator chamber, and is adapted to move the valve pin between the open and closed positions by means of fluid pressure in the actuator chamber during use of the valve gate apparatus. An elastomeric wiper seal extends around and engages the valve pin adjacent the machined bore. This wiper seal is made of wear resistant material and is capable of withstanding operating temperatures for the valve gate apparatus of at least 200° C. A micro gap between 1 and 10 microns is formed between the valve pin and the machined bore and a zero gap is formed between the wiper seal and the valve pin.

According to another embodiment of the present disclosure, a nozzle valve gate for injecting hot plastics material into an injection mold for molding a plastics product or part includes an actuator mechanism having an actuator chamber and a piston slidably mounted in the chamber and movable therein by fluid pressure in the actuator chamber during use of the valve gate apparatus. The valve gate apparatus also has an injection arrangement that includes an injection nozzle having a longitudinal axis and extending in the longitudinal direction to a nozzle tip having an injection aperture for the hot plastics material to flow into the injection mold. This injection nozzle forms an injection passage for conducting the hot plastics material from at least one inlet of the injection arrangement to the injection aperture. The injection arrangement has a machined guide bore extending in the longitudinal direction. A valve pin extends through the guide bore and is movable therein to open or close the injection aperture. The valve pin is connected to the piston and movable thereby. An elastomeric wiper seal extends around and slidably engages the valve pin. This seal is capable of withstanding injection nozzle operating temperatures of at least 200° C. and is mounted in the injection arrangement adjacent the guide bore. The seal is separated from the injection passage by at least a section of the guide bore. A micro gap is provided between the valve pin and at least the aforementioned section of the guide bore and a zero gap is formed between the wiper seal and the valve pin.

In one version of this valve gate apparatus the injection arrangement includes a heatable manifold connected to an end of the injection nozzle located furthest from the nozzle tip. The guide bore is formed in the manifold and the wiper seal is mounted in a cavity formed in the manifold.

According to a further embodiment of the disclosure, a hotrunner system for injecting plastics material into an injection mold includes a hotrunner manifold having an inlet for receiving melted plastics material and a plastics feed conduit connected to the inlet. The manifold is adapted for operation at a desired elevated temperature suitable for flow of the melted plastics material through the manifold. The hotrunner system has a plurality of injection apparatus operatively connected to respective outlets of the feed conduit. Each injection apparatus has a nozzle device having a longitudinal axis and a longitudinal injection passage extending to a nozzle tip. An elongate valve pin extends through a machine guide bore formed in the nozzle device and movable in the bore between an open position at which the melted plastics can flow from a nozzle tip into the injection mold and a closed position to stop the flow of the plastics material from the nozzle tip. Each injection apparatus also has a piston connected to an end of the valve pin, slidably mounted in an actuator chamber formed in a nozzle device, and adapted to move the valve pin between the open and closed positions by means of fluid pressure in the actuator chamber during use of the hotrunner system. An elastomeric wiper seal extends around and engages the valve pin adjacent the guide bore. The wiper seal provides a zero gap between the wiper seal and the valve pin and is capable of withstanding operating temperatures for its respective injection apparatus of at least 200° C. A micro gap ranging between 1 and 10 microns is formed between the valve pin and the guide bore.

In one exemplary version of this hotrunner system, the nozzle device includes a nozzle rear body and a nozzle shaft connected to one end of the rear body. A central seal cavity is formed in a rear end of the nozzle shaft adjacent the rear body and the wiper seal is fixedly arranged in this seal cavity.

According to yet another embodiment of the hotrunner system of this disclosure, the hotrunner system for injecting plastics material into an injection mold for molding plastic devices or parts includes a hotrunner manifold having an inlet for receiving melted plastics material and a plastics feed conduit connected to the inlet. The manifold is adapted for operation at a desired elevated temperature suitable for flow of the melted plastics material through the manifold without undesirable degradation. This manifold forms actuator chambers. A plurality of nozzle members are mounted on at least one side of the manifold and each has a longitudinal axis. Each nozzle member has an injection passage operatively connected to a respective outlet of the feed conduit and extending to a nozzle tip. Also each nozzle member has a longitudinal guide passage formed therein and comprising a machined bore. A plurality of elongate valve pins each extend through a respective one of the guide passages and each is movable therein between an open position at which the melted plastics material can flow from the respective nozzle tip into the injection mold and a closed position which stops flow from the nozzle tip. A micro gap is formed between each valve pin and its respective machined bore and this micro gap under normal hotrunner system operating conditions helps to prevent hot melted plastics material in the respective nozzle member from passing through the micro gap into the adjacent actuator chamber. Elastomeric wiper seals each extend around a respective one of the valve pins adjacent its respective machined bore. The wiper seals are made of wear resistant material and are capable of withstanding temperatures of at least 200° C. A zero gap is formed between each wiper seal and its respective valve pin. A plurality of pistons are each connected to a rear end of a respective one of the valve pins. Each piston is slidably mounted in an associated one of the actuator chambers and each is adapted to move its respective valve pin between the open and closed positions by means of fluid pressure in the associated actuator chamber.

In one version of this hotrunner system, the nozzle members are mounted on two opposite sides of the manifold and each nozzle member on one side is aligned in a back-two-back manner with a respective nozzle member on the opposite side.

These and other aspects of the nozzle valve gate apparatus and hotrunner systems of the present disclosure will become more readily apparent to those having ordinary skill in the art from the following detailed description taken in conjunction with the drawings provided herewith.

BRIEF DESCRIPTION OF THE DRAWINGS

So that those having ordinary skill in the art to which the present disclosure pertains will more readily understand how to make and use the subject invention, exemplary embodiments thereof will be described in detail herein below with reference to the drawings, wherein.

DETAILED DESCRIPTION OF EXEMPLARY EMBODIMENTS

Figure 1:
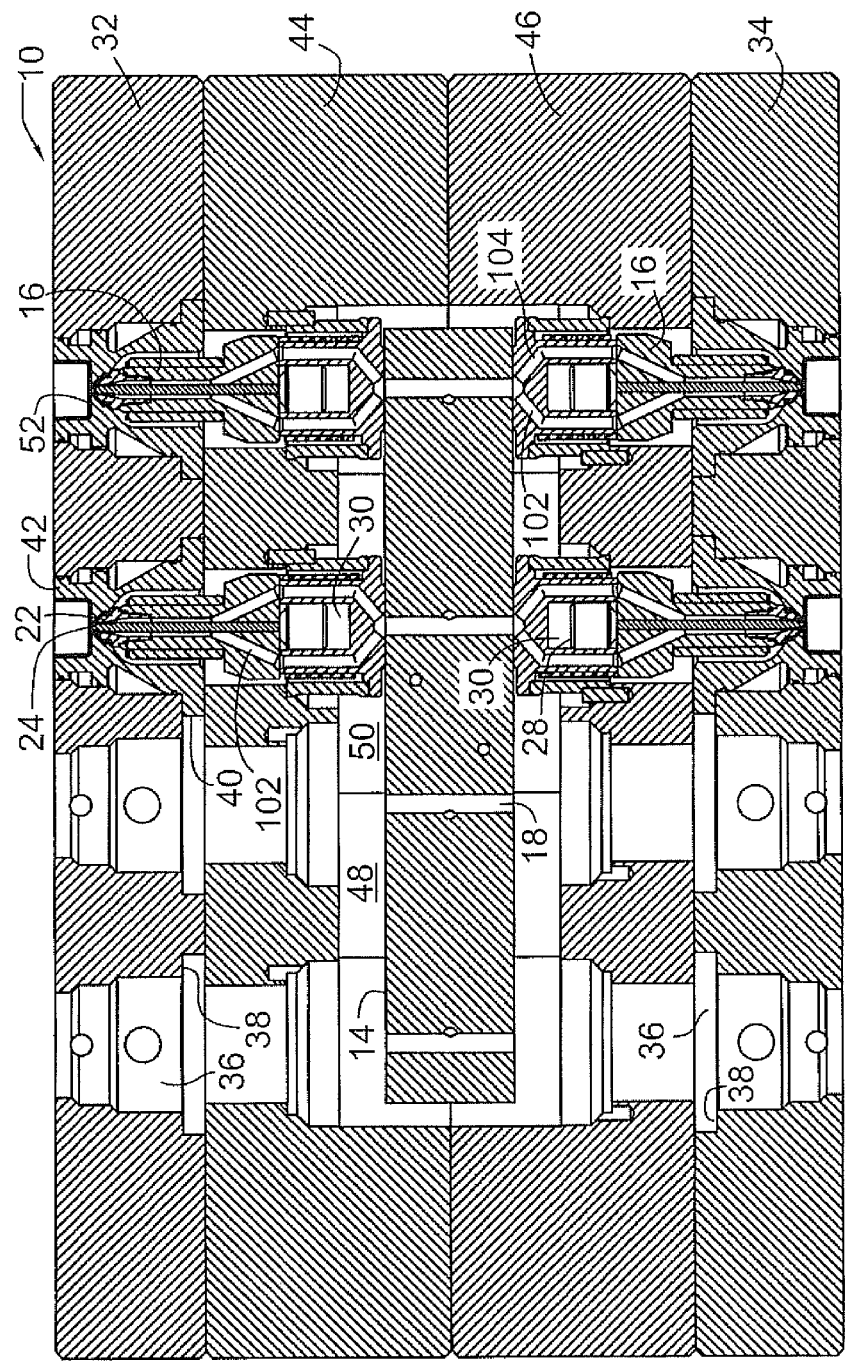
FIG. 1 is a longitudinal cross-section of a hotrunner molding system, this view being partially broken away on the left side for sake of illustration.
Figure 2:
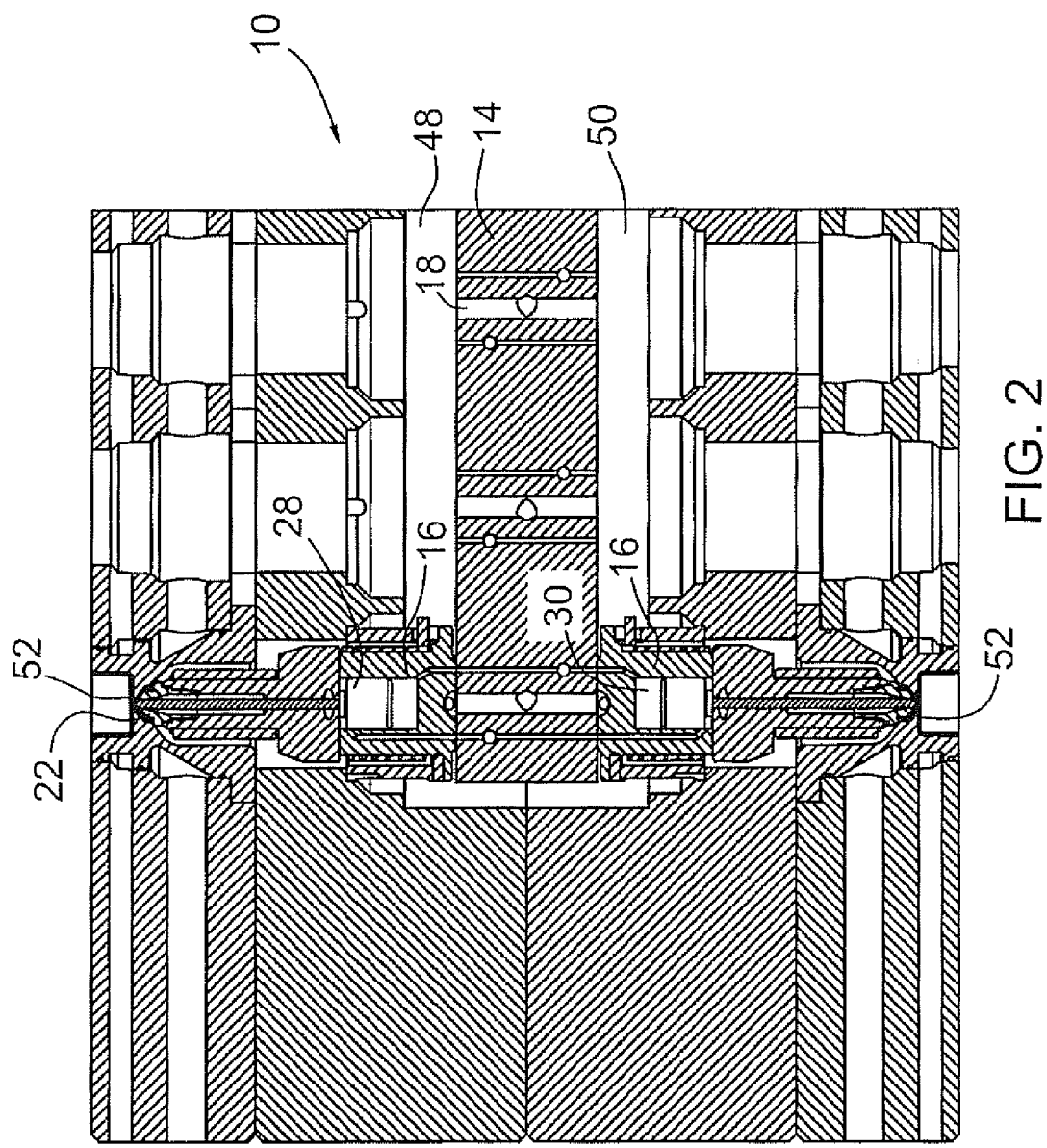
FIG. 2 is a transverse cross-section of the hotrunner molding machine of FIG. 1 with a portion of the machine on the right side being omitted for ease of illustration.
Figure 5:
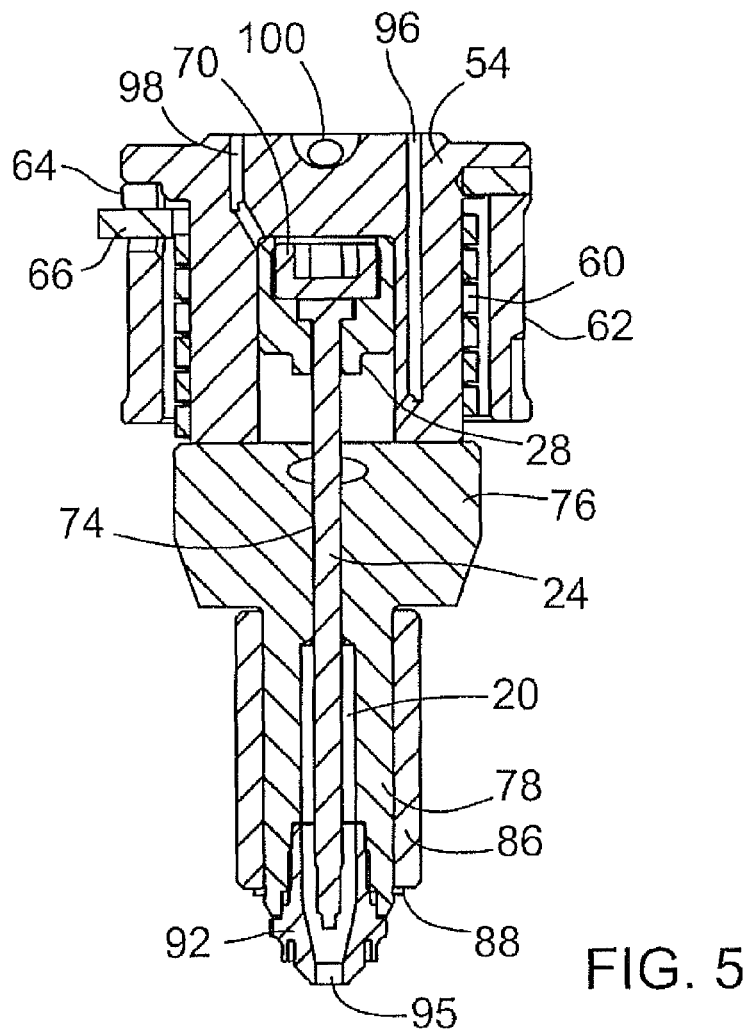
FIG. 5 is a longitudinal cross-section of the nozzle valve gate taken along the line V-V of FIG. 4.
Figure 6:
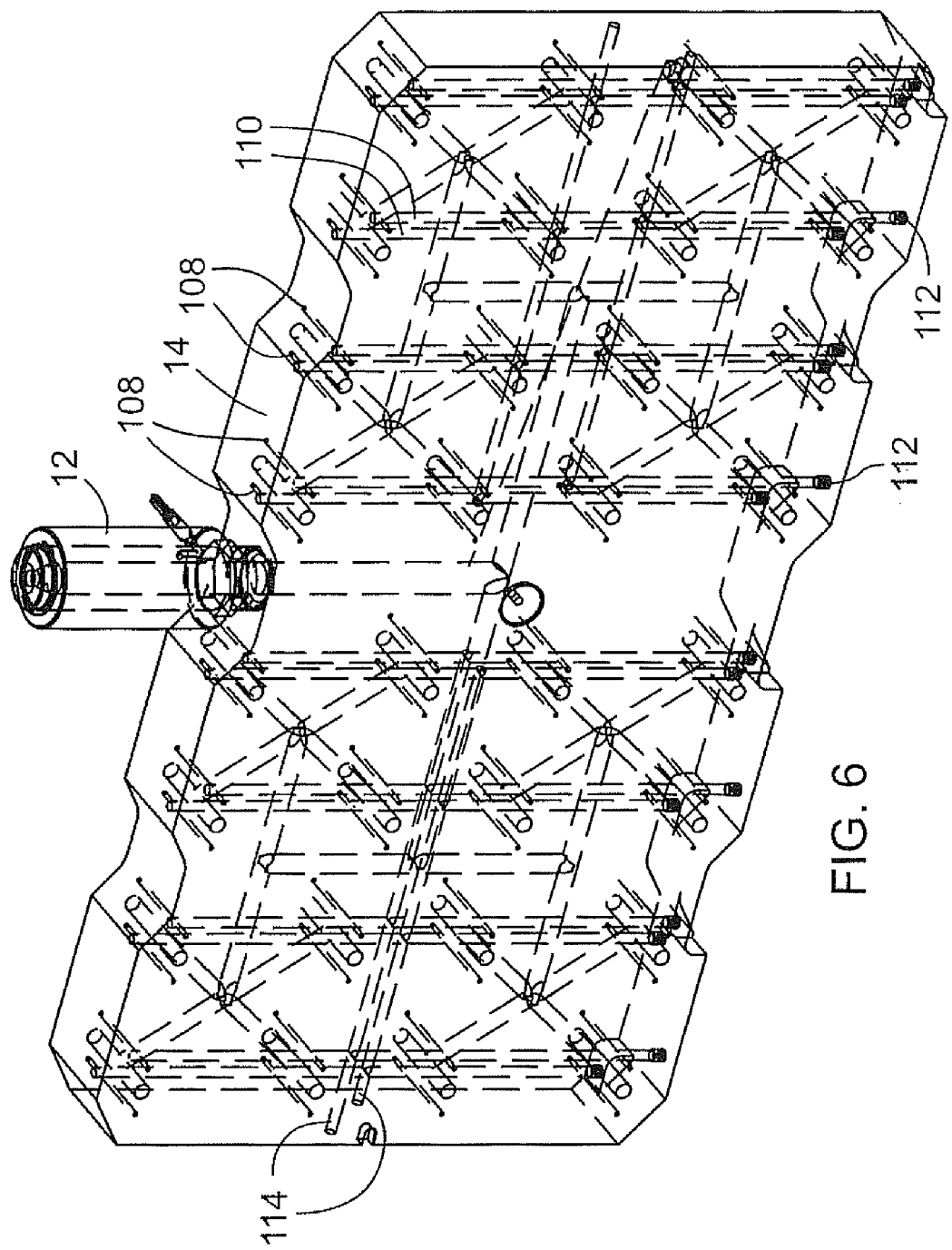
FIG. 6 is a transparent, perspective view of a manifold plate that can be used in a hotrunner system of the present disclosure.
Figure 7:
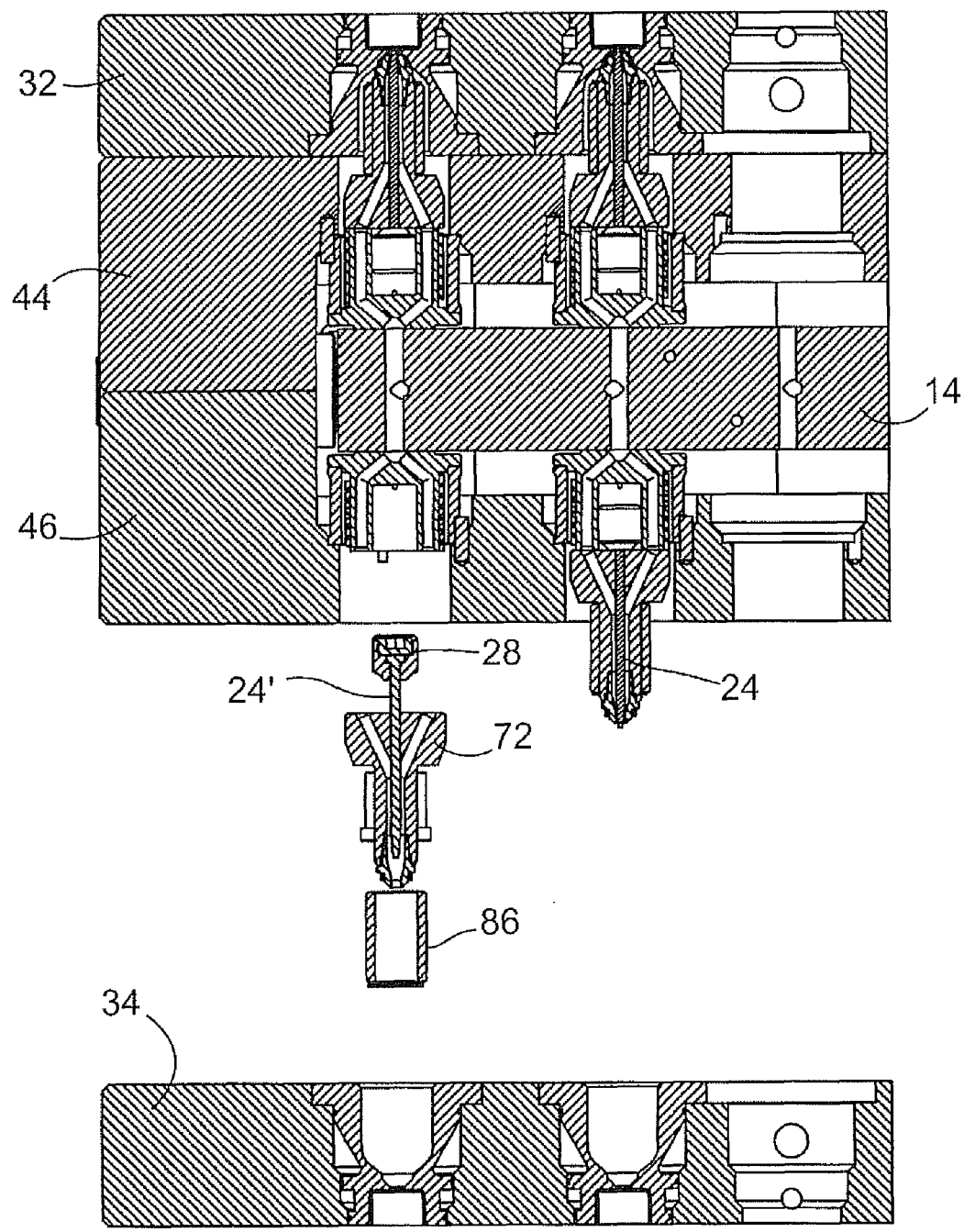
FIG. 7 is a partial, longitudinal cross-section of the hotrunner molding machine of FIG. 1, this view showing a cavity plate on the bottom side in a separated position in order to allow access to and disassembly of a nozzle valve gate.

Shown in FIGS. 1 and 2 is a partially illustrated hotrunner system 10 for injecting plastics material from a plasticiser unit into an injection mold for molding plastic devices or parts. A barrel of a plasticiser unit is shown in FIG. 6 and is indicated at 12. It will be appreciated that the barrel and the plasticiser unit are of standard construction and are well known in the manufacture of plastic products. FIG. 6 illustrates the barrel connected to one side edge of a manifold plate 14, a cross-section of which is shown in FIGS. 1 and 2. The barrel is typically heated to the required temperature for the particular plastics material being used by heaters such as electrical heaters. The manifold plate itself is heated to an elevated temperature suitable for conducting the melted plastics material without significant thermal degradation by electric heaters (not shown). A plurality of injection apparatus 16 are mounted in the hot runner molding machine with FIG. 1 showing four of these apparatus, two on each side of the manifold plate plus an additional four cavities in which four further apparatus can be mounted. Each of these apparatus is mounted to a downstream end of a plastics feed conduit indicated generally at 18. Each injection apparatus is in the form of a nozzle device having a longitudinal axis that extends perpendicular to the adjacent surface of the manifold plate. Each injection apparatus has a longitudinal injection passage 20, a portion of which can be seen in FIG. 5. This passage extends to a nozzle tip 22 which can be of standard construction. Each injection apparatus also has an elongate valve pin 24 extending through a longitudinal guide passage formed in a nozzle device. This passage is indicated at 26 in FIG. 5. The valve pin is movable in this passage in the direction of the longitudinal axis between an open position at which the melted plastics material can flow from the nozzle tip into the injection mold and a closed position to stop the flow of the plastics material from the nozzle tip. The valve pins are shown in the closed position in FIGS. 1 and 2 while FIG. 7 shows the valve pin indicated at 24' in the open position. A cylindrical piston 28, which in an exemplary embodiment is made of tool steel is connected to a rear end of the valve pin and is slidably mounted in an actuator chamber 30 which is formed in the nozzle device. The piston is adapted to move the valve pin 24 of each injection apparatus between the open and closed positions by means of fluid pressure in the actuator chamber 30 during use of the hotrunner system.

Other major components of the hotrunner molding machine of FIGS. 1 and 2 include two cavity plates 32 and 34 located at the top and at the bottom of the machine as illustrated in these figures. Each plate is formed with stepped cavities 36 in each of which is mounted a portion of a respective one of the injection apparatus 16. In particular each of these cavities can be formed with an annular shoulder at 38 which engages an annular flange 40 formed on annular mold section 42 into which a section of the injection apparatus extends. Located between the two cavity plates are two, similar manifold mold plates 44, 46 which are held against one another under pressure applied through the cavity plates. Formed between the two mold plates is a manifold cavity 48 with only a left portion of this cavity being shown in FIG. 2. The manifold plate 14 is mounted centrally in this cavity as shown so that there is an insulating air gap 50 extending completely around the manifold plate. Furthermore it will be understood by those skilled in the hotrunner art that coolant passageways (not shown) can be formed in the cavity plates 32, 34 which are typically maintained at a temperature in the range of 200 to 400° C. The actual temperature selected in this range will depend upon the particular type of plastic being molded. Additional coolant passages (not shown) can be formed in the mold plates 44, 46. A suitable coolant is circulated through these passages to maintain these plates at the desired temperature for operation of the mold apparatus and the hotrunner system. Mold cavities 52 are typically formed in the mold inserts or mold sections 42 that are secured in the cavity plates so the mold apparatus can be used to make the desired plastics parts.

Figure 3:
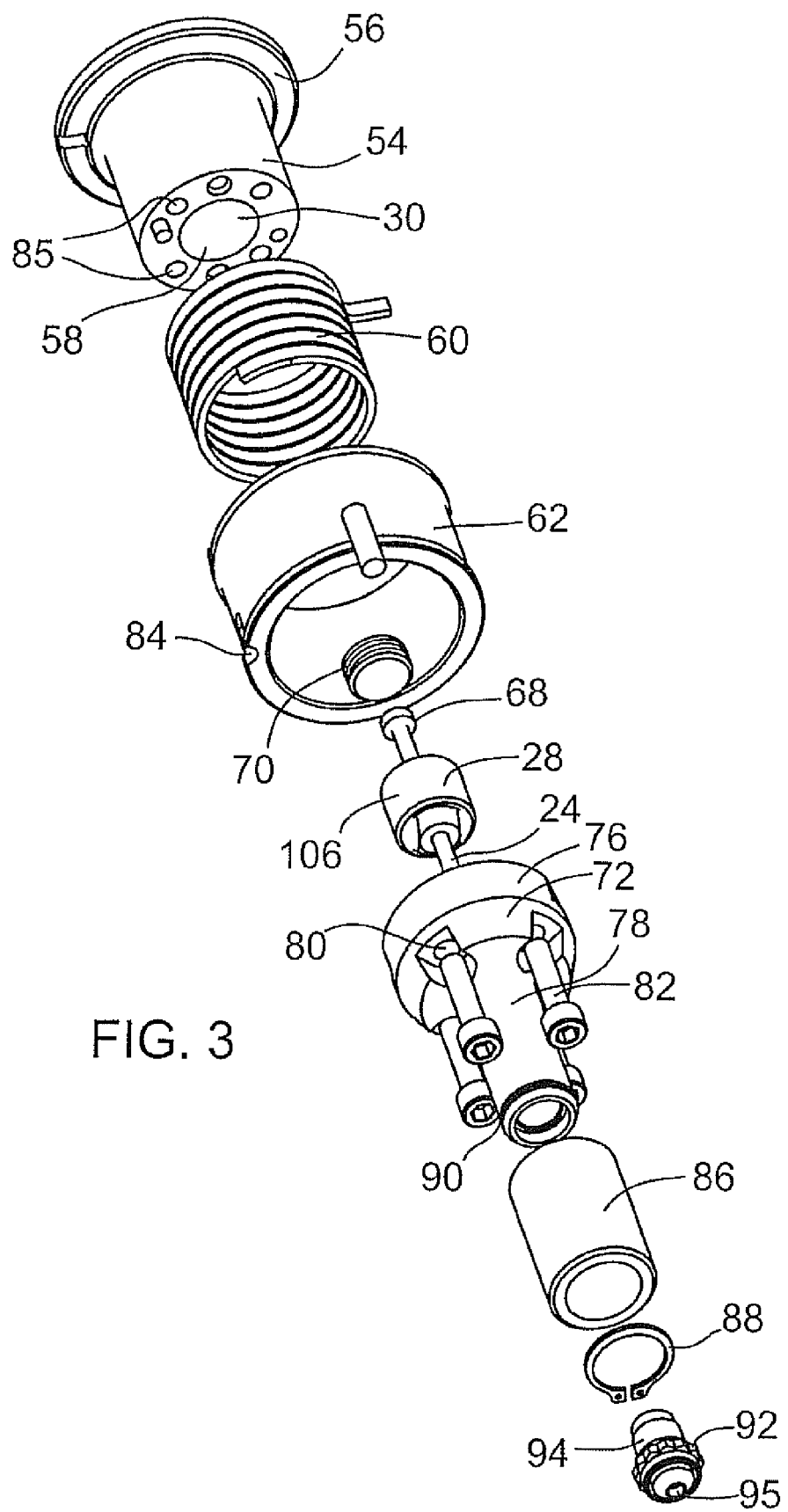
FIG. 3 is an exploded view showing the components of a nozzle valve gate used in the machine of FIGS. 1 and 2.

Turning now to the components which make up a nozzle valve gate apparatus for the hotrunner system, FIG. 3 shows these components separated from each other for ease of understanding. At the top of FIG. 3 is a nozzle rear body 54 formed with an end flange 56 that extends radially outwardly. Formed in this rear body is the actuator chamber 30 which has a cylindrical shape and which is surrounded by a cylindrical wall 58. There is also a coil heater 60 which can be electrically operated and which, as shown in FIG. 5, extends around the cylindrical outer wall of the rear body 54. This heater is used to maintain the rear body at the required elevated temperature for the hot plastics material flowing through the rear body. The injection apparatus further includes a spring elastic nozzle support sleeve 62 which has a cylindrical exterior and defines a cylindrical passage sized to extend about the heater 60. An opening can be provided at 64 for passage of an electrical connector 66. Located in the actuator chamber is the piston 28 which has a central axial passage into which an upper end section of the valve pin 24 extends. The exemplary pin shown has an end flange 68 which acts to hold the end of the valve pin in the piston. This end is locked in the piston by means of a set screw 70. The threads on the set screw cooperate with threads formed above the recess in the upper end of the piston to hold the set screw firmly in place. The valve pin extends through a nozzle part or shaft 72 which has the central, longitudinal guide passage 26 formed therein that guides the movement of the valve pin. The illustrated exemplary nozzle part or shaft 72 has a wider end section 76, which is adjacent the rear body 54, and a narrower nozzle section 78. The wider end section 76 is formed with a plurality of screw holes 80 through which extend longitudinally bolts 82. In the illustrated embodiment there are four of these bolts and these are threaded into holes 85 formed in the rear body 54. In this way the nozzle shaft is detachably but firmly connected to the rear body. Moreover it will be seen that this arrangement allows the nozzle shaft to be detached from the rear body from the nozzle tip end of the injection apparatus for ease of maintenance, etc.

Also shown in FIG. 3 is a cylindrical, hollow nozzle heater 86 which extends around the nozzle section 78 and is used to maintain this section at the desired elevated temperature. The heater is held in place by a heater retainer ring 88 which is a split ring which fits into groove 90 formed near the end of the nozzle section 78. Mounted in the nozzle section 78 is a nozzle tip 92 which has a threaded exterior 94. These threads engage internal threads in the nozzle section 78 for attachment of the nozzle tip. FIG. 5 shows the valve pin in the open position at which melted plastics material can flow through injection passage 20 and can flow from the aperture 95 formed in the nozzle tip into the injection mold. Forward movement of the piston will cause a corresponding downward movement of the valve pin to the closed position which is shown in FIGS. 1 and 2. In this position the flow of the plastics material from the nozzle tip is stopped completely.

Figure 4:
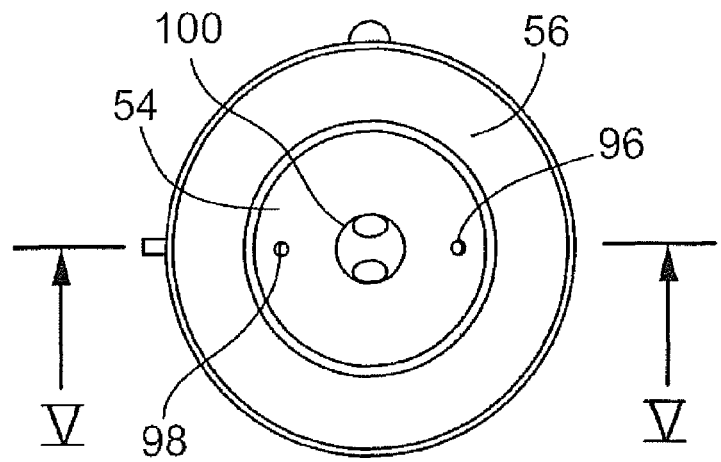
FIG. 4 is an end view of a nozzle rear body used in the nozzle valve gate of FIG. 3.

Also visible in FIG. 5 are air passageways for delivering pressurized dry air to and from the actuator chamber. These passageways are formed in the rear body or chamber forming body 54 and include a longer passageway 96 that extends from the top end of the rear body to a point adjacent the bottom end of the actuator chamber and a shorter passageway 98 that extends from the top end of the rear body to the top of the actuator chamber 30. Also visible in FIGS. 4 and 5 is an opening 100 for the flow of hot plastics material into the injection apparatus from the feed conduit 18 formed in the manifold plate. In the injection apparatus shown, an injection passage for the hot plastics material extends through the length of both the nozzle rear body 54 and the nozzle part or shaft 72. This injection passage which includes the passage 20 splits into sub-passageways 102 and 104 formed in the nozzle rear body, these sub-passageways during use of the hotrunner system diverting melted plastics material around the actuator chamber 30. In the illustrated embodiment there are two of these sub-passageways located on opposite sides of the actuator chamber. It is possible for there to be more than two sub-passageways distributed about the circumference of the chamber and it is also possible for there to be only one flow passage that extends around the actuator chamber and is formed in the cylindrical wall of the body 54.

It will be seen from FIGS. 1 and 2 that each injection apparatus including the actuator chamber 30, its piston 28 and the valve pin are mounted on a side of the manifold or manifold plate 14 facing the injection mold which is maintained at an elevated temperature for the flow of the plastics material. In addition the actuator for the valve pin including the nozzle rear body 54 and the piston are themselves at an elevated temperature because of the flow of hot plastics material through the sub-passageways in the rear body 54. Because of these elevated operating temperatures, the piston 28 and the section of the injection apparatus forming the actuator chamber 30 (that is the nozzle rear body 54) are machined to close tolerances to as to form a micro-gap between peripheral wall 106 (see FIG. 3) of the piston and the adjacent wall 58 of the actuator chamber in the range of 1-10 microns (the μm). Because of this micro-gap there is no need for fluid seals between the piston and the wall 58. As a result the nozzle device and its piston provide a valve pin actuator able to operate within plastic injection temperatures ranging between 200 and 400° C. Note the "micro-gap" referred to herein is the measured gap formed between the wall of the piston and the wall of the actuator chamber when the walls are in contact with each other on one side of the actuator. Thus the "micro-gap" is measured at a point diametrically opposite the contact point of the two walls. It is this distance which ranges between 1 and 10 microns.

In the illustrated hotrunner system, the valve pin actuator is a pneumatic actuator operating on pressurized air, this pressurized air being delivered through gas bores 108 formed in the hotrunner manifold plate 14. A gridwork of gas bores can be seen in the transparent view of FIG. 6. These bores can include pairs of larger, parallel bores 110 that extend across the width of the manifold plate. These bores can be open at one end for connection to pressurized gas lines and can be plugged at their opposite ends, these plugs being indicated at 112. Further, longitudinally extending gas bores can be provided at 114, these bores intersecting the bores 110. The bores 114 can be connected to further pressurized air lines (not shown) at each end of the manifold plate.

Because of the provision of a micro-gap between the peripheral wall of the piston and the adjacent wall of the actuator chamber, the piston does not have a greater co-efficient of thermal expansion than the cylindrical wall 58 of the actuator chamber. In an exemplary version of the actuator, the piston and the adjacent wall of the actuator chamber have approximately the same co-efficient of thermal expansion. As shown in FIGS. 1 to 3, the piston chamber or actuator chamber 30 is a cylindrical precision bore with its open end facing towards the front piece of the nozzle, that is, the nozzle part or shaft 72. The piston and the cylindrical wall of the actuator 30 allow a low friction movement and the micro-gap between them prevents air leak and pressure drop and consequently avoids undesirable loss of valve pin force. The piston 28 and the wall 58 of the actuator chamber can be either hardened metal or ceramic. In one sample embodiment, the piston is made of tool steel or machine steel and the adjacent wall of the actuator chamber has a machined nitride surface which is harder than the peripheral wall of the piston. Alternate possible surfaces of the piston and/or the wall of the actuator chamber are surfaces with physical vapour deposition (PVD) or CVD enhancement. It will be appreciated that physical vapour deposition on the peripheral wall of the piston can provide lubricant at the high operating temperatures of the hot runner system. Also to provide desirable lubrication the wall 58 of the actuator can be impregnated with a high temperature dry lubricant in a manner known per se. The process for providing lubricant by means of physical vapour deposition can, for example, use TiN or CrN which is deposited in a vacuum on the surface by plasma. The surface is bombarded with argon gas in an inert atmosphere.

It is also possible to construct the piston 28 of ceramic material which has a lower co-efficient of expansion. In this embodiment, the cylindrical surface of the actuator chamber can be made of tool steel. Another alternative for the piston 28 is molybdenum TZM alloy, an alloy which is 98% molybdenum and which is self-lubricating. If a piston of this material is used, the cylindrical surface of the actuator chamber can be made of tool steel which has a slightly higher co-efficient of expansion than the molybdenum alloy of the piston.

In one embodiment of the actuator for the valve pin there is at least a 10 Rockwell difference between the hardness of the piston material and the hardness of the wall of the actuator chamber. The piston 28 is made of the softer material since it is easier to replace when it becomes worn.

With respect to the air pressure required to operate the actuator of each injection apparatus, the air pressure delivered to the actuator chamber can be in the 100 to 120 PSI range, which is a standard level of pressurized air that can be provided by a compressor. If a higher level of pressurized air is required for operation of the injector apparatus, the air pressure can be amplified, for example to overcome high injection pressure that is acting on the front end of the valve pin. A typical valve pin in a system such as that shown in FIGS. 1 and 2 has the diameter ranging between 2.5 and 4 mm and can be used to open and close a valve gate orifice 95 having a diameter of 1-2 mm.

FIG. 7 illustrates the front access capability of the valve gate nozzle when the mold cavity plate 34 is removed. As shown in FIG. 7, the molding machine allows the cavity plate 34 to be separated a sufficient distance from the adjacent mold plate 46 to allow ready access to the injection apparatus 16 that extend between these two plates. The same is true of the other cavity plate 32 and its adjacent mold plate 44. It will be seen that the present hotrunner system as illustrated in FIGS. 1, 2 and 7 provides accessibility from the cavity side of the mold. In other words when the cavity plate 32 or 34 is removed as shown in FIG. 7, each hotrunner nozzle on its side of the manifold has front exposure. This easy access for maintenance allows servicing the nozzle tip, the nozzle heater 86 and its thermal couple, the valve pin 24 and the valve pin actuator including the piston while the mold remains inside the machine. This access is unlike other valve pin actuators that are conventionally mounted on the side of the nozzle or entirely at the opposite backside of the manifold or even traditionally in the top clamp plate of the mold. In these prior art arrangements, access for maintenance and repairs can require the removal of the mold from the molding machine and this results in considerable downtime.

Figure 9:
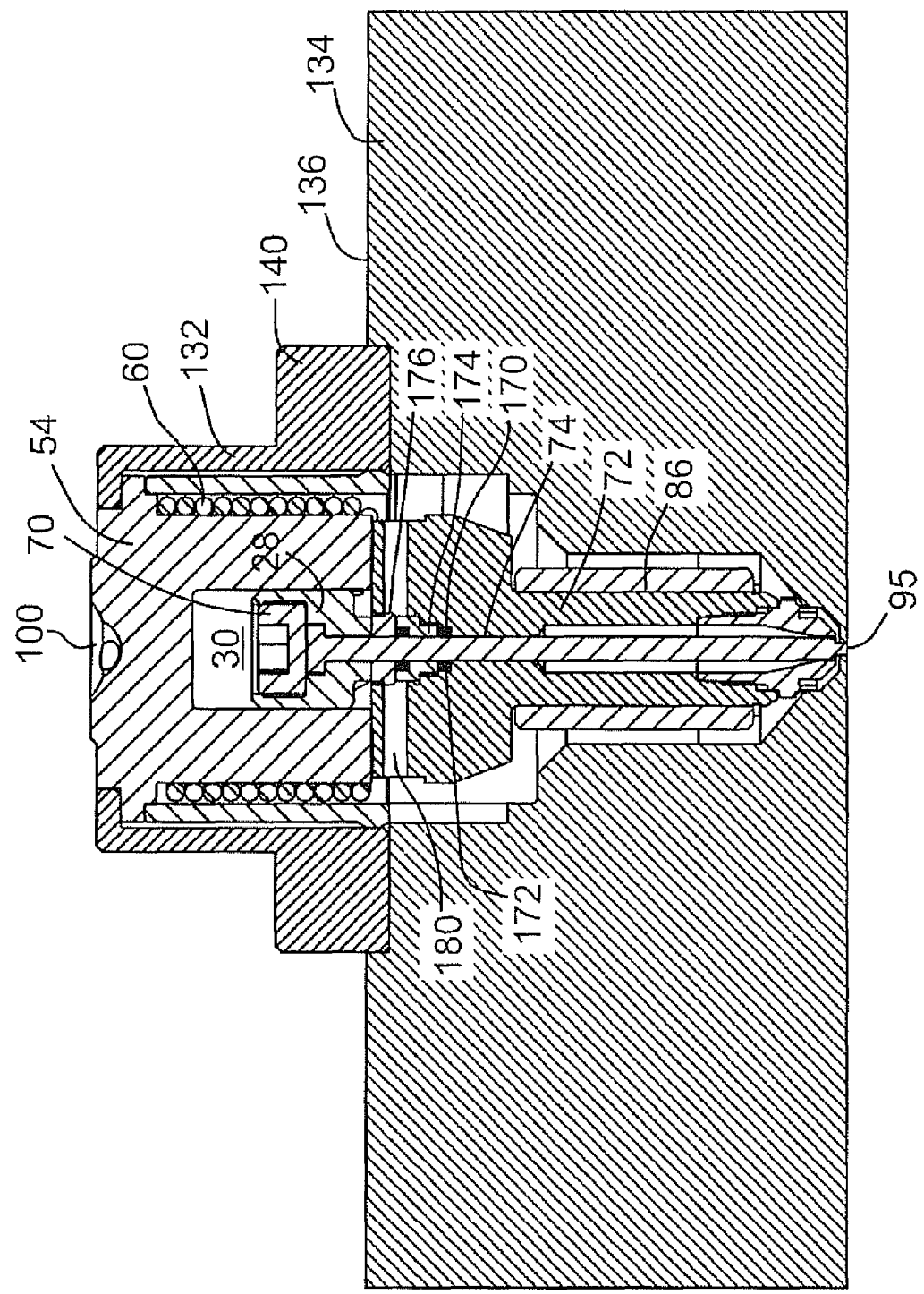
FIG. 9 is a cross-sectional view taken along the line IX-IX of FIG. 8 with a portion of the left side of the cavity plate broken away for ease of illustration.
Figure 10:
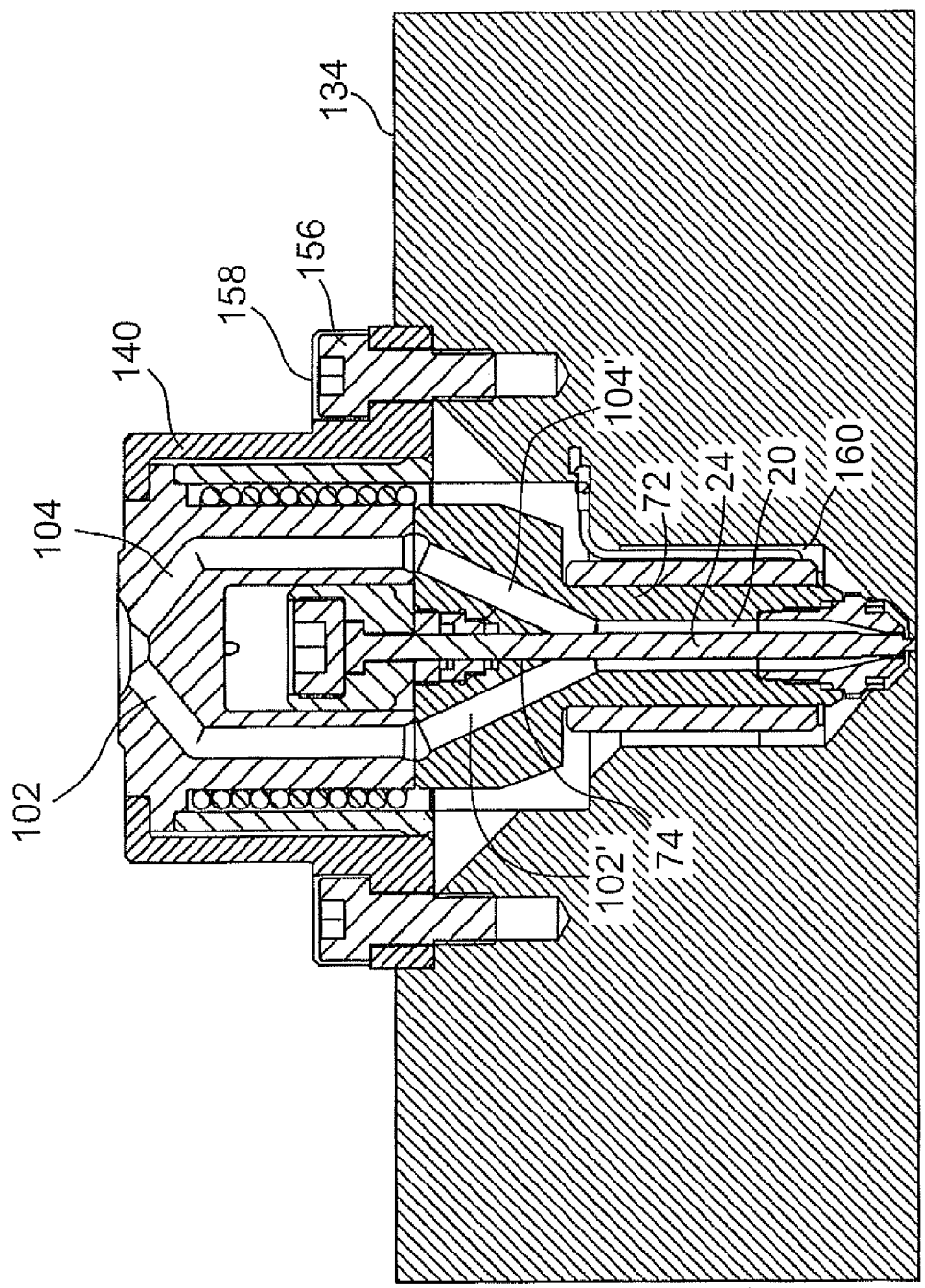
FIG. 10 is another cross-sectional view taken along the line X-X of FIG. 8.
Figure 11:
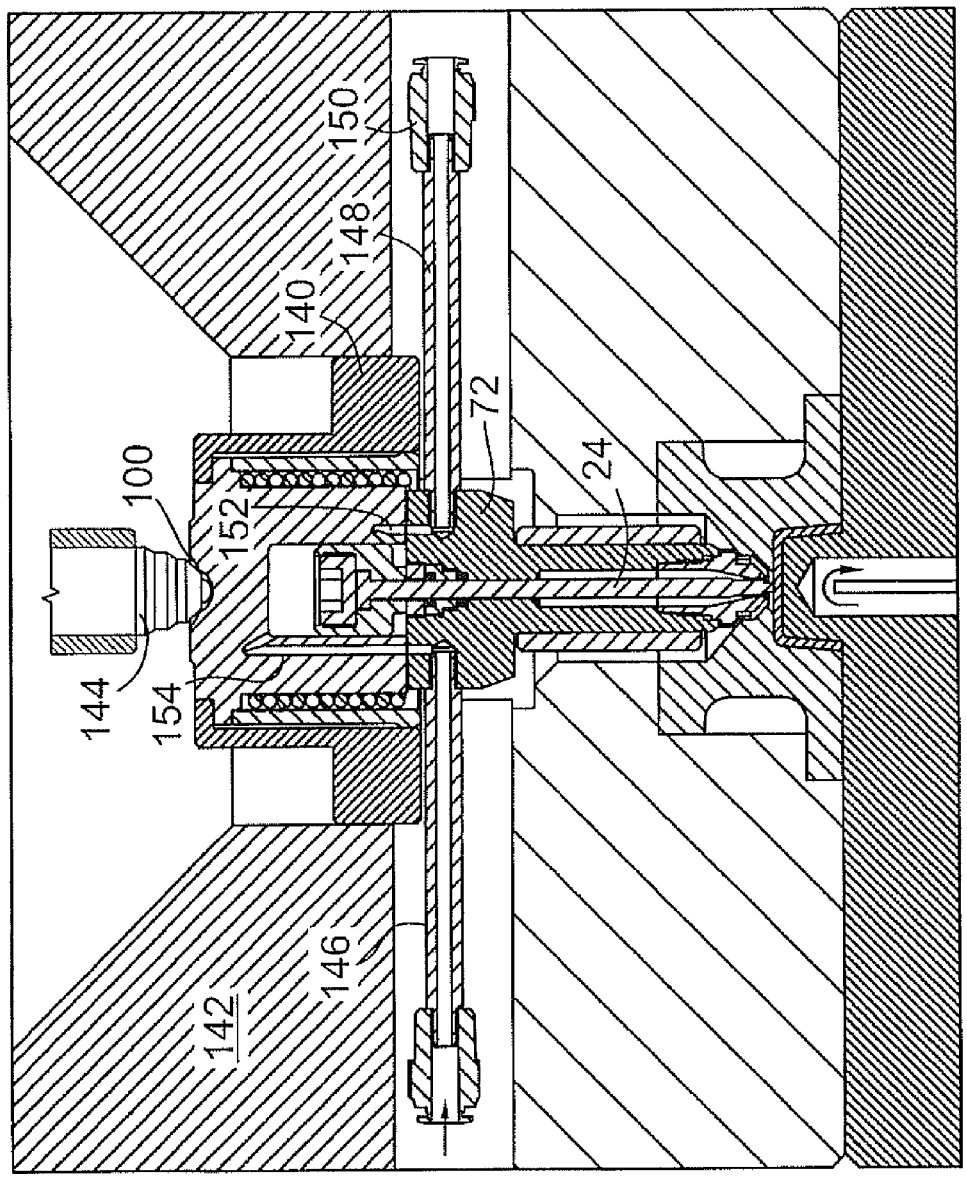
FIG. 11 is a further cross-sectional view taken along the line XI-XI of FIG. 8.

FIGS. 8 to 11 illustrate an embodiment of the present disclosure wherein the molding apparatus has only a single valve gate nozzle or injection apparatus which is not attached to a melt distribution manifold. This nozzle valve gate apparatus, which is indicated generally at 130, is suitable for injecting hot plastics material into an injection mold for molding a plastics product or part. The drawings illustrate a nozzle valve gate 132, a bottom section of which is mounted in a cavity plate 134 of rectangular shape. The plate has a top surface 136 in which is formed a cavity for receiving the nozzle valve gate. A bottom surface of the gate is formed with an orifice 95 that can be opened or closed by the valve pin 24. As in the embodiment of FIGS. 3 to 5, the nozzle valve gate has a nozzle rear body or chamber forming body 54 which forms an actuator chamber 30. A piston 28 is slidably mounted in this chamber and is connected to the top end of the valve pin using a threaded set screw 70. An electric coil heater 60 extends around the rear body and another electric heater 86 extends around the nozzle shaft 72 which forms a guide passageway for the valve pin. The nozzle valve gate or injection apparatus is bolted to the plate 134 by means of a mold locating ring 140 through which extends a top section of the nozzle rear body 54. As shown in FIG. 11, the mold locating ring 140 fits snugly within a counterbore formed in a machine clamp plate which is maintained at a relatively cool temperature. Also illustrated in FIG. 11 is the lower portion of a machine nozzle of the molding machine, this machine nozzle being indicated at 144. The outlet of the machine nozzle injects hot plastics material into the top opening 100 of the injection nozzle.

Pressurized air to move the piston 28 in the actuator chamber is provided through two elongate pipes or air lines 146, 148, each provided with a fitting 150 for attachment purposes. The air line 148 is operatively connected to internal gas passage 152 which is relatively short and delivers air to the bottom side of the piston. The other air line 146 is operatively connected to a longer internal gas passage 154 which is able to deliver air to the topside of the piston. Each air line can be provided with a reduced diameter end section which is externally threaded for connecting the air line to the nozzle shaft 72. The pressurized air flow through the air lines 146, 148 is controlled by five/three position solenoid valves of known construction. Pressurized gas is delivered through the air line 148 in order to move the valve pin to the open position allowing plastics melt to be injected into the mold cavity. Air at the top of the actuator chamber can escape from the chamber through the air line 146. In order to close the valve gate, pressurized air is delivered through the air line 146 to the top end of the actuator chamber which causes the valve pin to move to the closed position.

Figure 8:
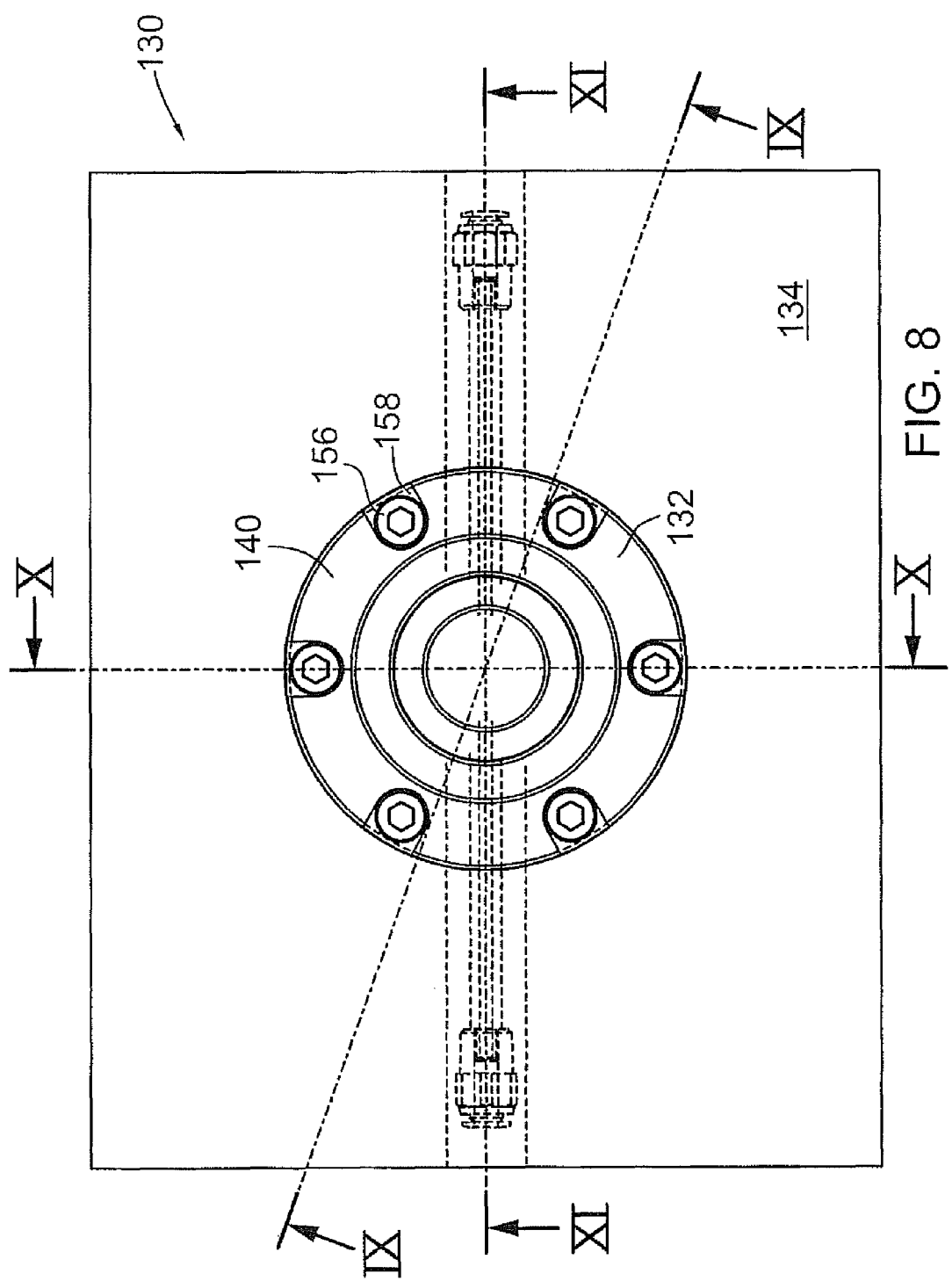
FIG. 8 is a top view of a nozzle valve gate apparatus, this view showing the top of a nozzle valve gate actuator and the cavity plate in which the valve gate is mounted.

With reference now to FIGS. 8 and 10, there are shown therein mounting screws 156 which are used to detachably connect the mold locating ring 140 to the cavity plate 134. In the illustrated embodiment, there are six of these mounting screws and the head of each screw is located in a screw recess 158 formed in the mounting flange that extends around the locating ring 140.

Shown also in FIG. 10 is the plastics injection passage system that extends through the valve gate nozzle. As in the embodiment of FIGS. 1 and 2, the injection passage splits into two sub-passageways 102, 104 in the actuator section of the valve gate nozzle. These two sub-passageways extend along opposite sides of the actuator chamber 30 and are located in the wall forming the actuator chamber. In the nozzle shaft 72, these two sub-passageways converge at 102' and 104'. The converging sections meet at the annular passage 20 that surrounds the valve pin. It is also possible to have only one passageway extending around one side of the actuator chamber. Also visible in FIG. 11 is a thermal couple 160 which is used to monitor the temperature of the nozzle shaft in a manner known per se. Thermal couples can be provided elsewhere on the valve gate as well in a known manner.

Shown in FIGS. 9 to 11 is a wiper seal assembly indicated generally at 170. This assembly through which the valve pin 24 extends is mounted in the top end of the nozzle shaft 72. The wiper seal assembly can include one seal ring 172 or several seal rings that are held in position in a counterbore and in a retainer housing 174 by a set screw 176. The set screw is threaded into an opening formed in the top of the nozzle shaft 72 so as to engage the top of the retainer housing 174. The purpose of the wiper seal assembly is to provide a zero gap precision fit with the valve pin which is slidable therein. The wiper seal provides a tight fitting seal that allows the valve pin to move in the axial direction between the open and closed positions while at the same time preventing leakage of plastics melt past the seal. Because the wiper seal is installed in a high temperature operating environment inside the heated nozzle body, the seal is selected to withstand the plastic processing temperature of thermal plastics material normally ranged between 200° C. and 300° C. (309° F. to 575° F.). The selected seal or seals desirably provide good lubricity, elasticity and a temperature resistance of more than 300° C. A suitable material for the wiper seal is polyimide with molybdenum disulfide filler or polytetrafluoroethylene (PTFE) with boron nitrite filler. A wiper seal of this material can have a temperature rating of 600° F. for long term use and up to 900° F. for medium term use. Thus such seals are suitable for the entire processing temperature range of standard thermoplastic materials. The wiper seal assembly 170 can also be used around the valve pins in the hotrunner system of FIGS. 1 and 2. Possible base materials for the wiper seal include a high temperature resistant polymer such as PI (polyimide), PEI (polyether ether imide), or PEEK (polyether ether ketone) with the base material containing a filler to reduce friction. A typical filler for this purpose is the aforementioned PTFE or molybdenum disulfide ($MoS_2$). The elastomeric wiper seal can be installed in its holding cavity by being pushed in under a pre-load. The internal diameter of this seal can be five to ten microns smaller than the diameter of the pin, thus ensuring no gap between the pin and the seal. The wiper seal will expand as it is heated but is able to permit the required pin movement.

The valve pin movement is guided in the nozzle shaft by a guide passage 74. In an exemplary embodiment of the valve gate this guide passage is formed by a machined bore made to close tolerances so that a micro-gap is formed between the valve pin 24 and the machined bore. This micro-gap which can be in the order of several microns may allow polymer molecules, pigments and gases to escape to the outside of the passageways provided for the flow of hot plastics material. This is due to the high temperature of the hot plastics melt, the high injection pressure used to deliver the plastics melt to the valve gate and the valve pin stroke. This escape of material can cause over time maintenance issues inside the injection mold, but this escape can be prevented by the use of the above described wiper seal assembly. As with the micro-gap between the piston and the actuator chamber wall, the micro-gap between the valve pin and the machined bore is measured with the pin and the bore contacting each other on one side. The micro-gap is the distance between the side of the pin and the bore wall at the point diametrically opposite the contact point.

In addition to the provision of the micro-gap between the pin and the guide passage wall and the provision of the wiper seal assembly, a transversely extending additional passage 180 can be provided in the nozzle shaft 72 near its upper end. As shown in FIG. 9, this additional passage intersects the guide passage (including the guide passage that extends through the wiper seal assembly) at a location spaced from the actuator chamber 30. The passage 180 allows gases or plastics melt residue that has entered into the bore to escape. The passage 180 can be described as a decompression bore. It should be noted that it is also possible to employ this decompression bore even in a valve gate nozzle having no wiper seal assembly that extends about the valve pin. Note also that pressurized air in the actuator chamber itself can pass through the micro-gap around the valve pin (particularly in the case where no wiper seal assembly is used) and the escaping air flow provides self-cleaning of the annular gap that extends between the actuator chamber and the passage 180. Note that the micro-gap around the valve pin in an exemplary embodiment of the valve gate nozzle is between one and ten microns and is dependent in part on the diameter of the pin itself.

Figure 12:
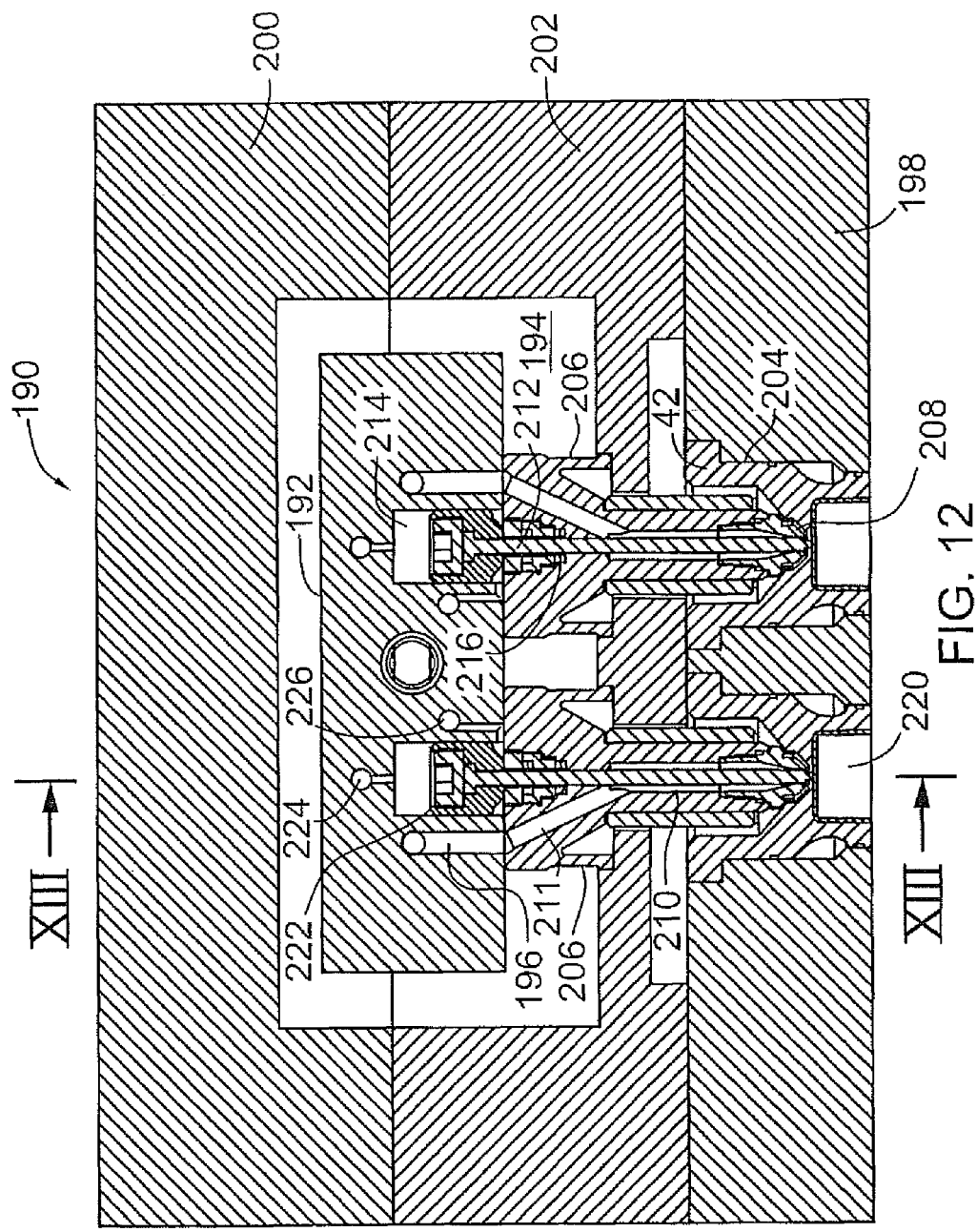
FIG. 12 is a longitudinal cross-sectional view of another embodiment of a hotrunner molding machine, this embodiment having actuator chambers located in the manifold.
Figure 13:
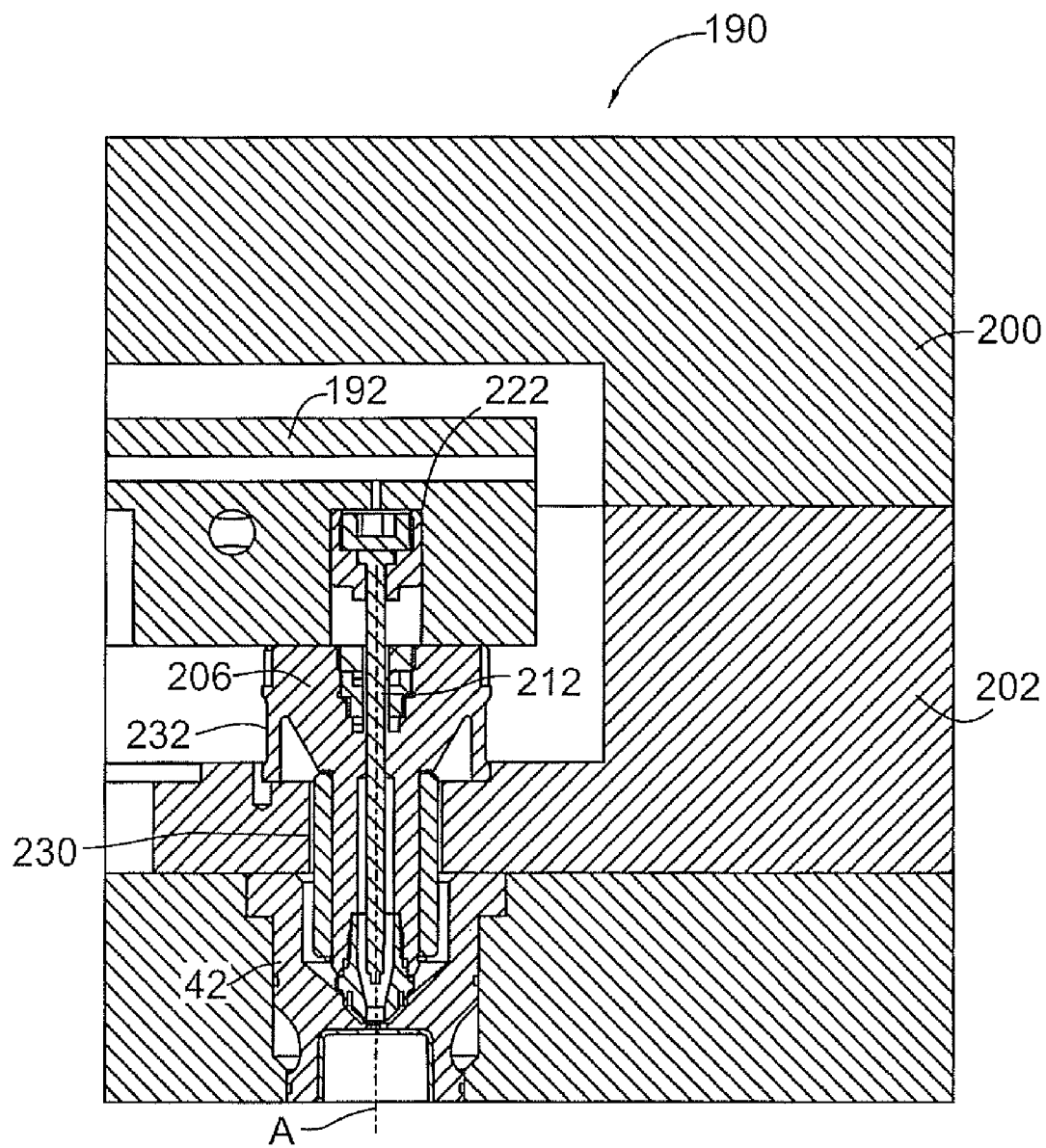
FIG. 13 is a transverse cross-section of the molding machine of FIG. 12, this view being taken along the line XIII-XIII of FIG. 12.

FIGS. 12 and 13 illustrate another form of hotrunner system constructed in accordance with the present disclosure. This hotrunner system, which is indicated generally by reference 190, has a centrally located manifold plate 192 which is located in an air containing cavity 194. Again, this manifold has an inlet for receiving melted plastics material from a plasticizer unit (not shown) and a plastics feed conduit 196 connected to this inlet. As in the above described versions of hotrunner systems, the manifold is adapted for operation at a desired elevated temperature suitable for the flow of the melted plastics material through the manifold without undesirable degradation. The hotrunner system has a mold cavity plate 198 and two manifold mold plates 200, 202 which are held against one another under pressure applied by the mold machine. The cavity 194 is formed between the two mold plates, only portions of which are shown in FIG. 13. The mold cavity plate is formed with two or more stepped cavities 204 in each of which is mounted a portion of a respective one of injection apparatus in the form of nozzle members 206. In this particular hotrunner system 190, there are two or more nozzle members 206 mounted on one side of the manifold plate 192 and each has a longitudinal axis indicated at A in FIG. 13. Each nozzle member has an injection passage operatively connected to a respective outlet of the feed conduit of the manifold and extending to a nozzle tip 208. A section of this passage which surrounds a bottom portion of a valve pin can be seen at 210. This portion, which extends along the longitudinal axis A, is connected to a sloping passage section 212 of which there is only one in this version of the nozzle member. An elongate valve pin 212 extends the length of its respective nozzle member and also extends into the manifold 192 in which are formed actuator chambers 214. As in the previous embodiments, each valve pin extends through a respective guide passage 216 and is movable therein between an open position (shown in FIG. 13) at which melted plastics material can flow from the respective nozzle tip into an injection mold 220 and a closed position (shown in FIG. 12) which stops flow from the nozzle tip.

This hotrunner system also has a plurality of pistons 222, each connected to a rear end of a respective one of the valve pins, slidably mounted in an associated one of the actuator chambers 214, and adapted to move the respective valve pin between the open and closed positions by means of fluid pressure in the associated actuator chamber. Pressurized air can be delivered through the manifold to the actuator chamber through air passageways indicated at 224 and 226.

Because of the high operating temperature of the manifold plate 192, it is necessary to avoid the use of seals between the peripheral wall of each piston and the surrounding cylindrical wall of the actuator chamber formed in the manifold. Accordingly, the pistons 222 and the cylindrical walls forming the actuator chambers are machined to close tolerances so as to form a micro gap between a peripheral wall of each piston and the adjacent cylindrical wall in the range of 1 to 10 microns. In this way, each piston 222 and its associated actuator chamber 214 provide a valve pin actuator able to operate within plastic injection temperatures ranging between 200° C. and 400° C.

In an exemplary form of this hotrunner system, each guide passage 216 comprises a machined bore and a micro gap is formed between each valve pin 212 and its respective machined bore. As explained above, the provision of such a micro gap helps to prevent hot melted plastics material in the respective nozzle member from passing through the micro gap into the adjacent actuator chamber under normal operating conditions. The above described wiper seal can be provided adjacent to or along the guide passage 212.

With particular reference to FIG. 13, it will be seen that each nozzle member 206 is clamped between and held in position by the manifold plate 192 and the mold plate 202. A circular opening can be provided at 230 in the mold plate and the nozzle member extends through this opening. The nozzle member has a wider rear section 232 which fits snugly into an annular recess formed on an inner surface of a mold plate. The narrower section of the nozzle member extends into its respective mold insert 42, which is mounted in the stepped cavity 204.

Figure 14:
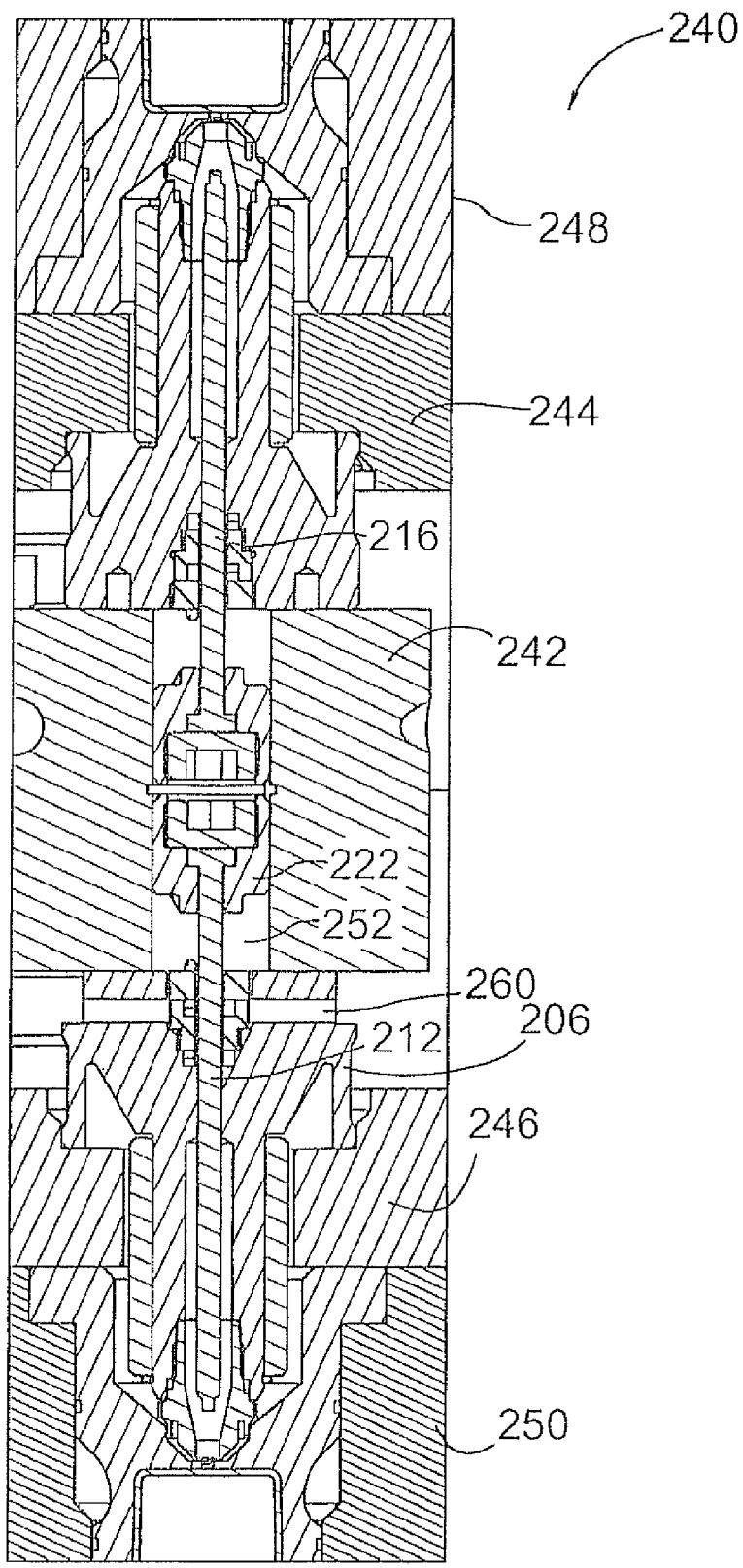
FIG. 14 is a cross-section of another embodiment of a hotrunner molding machine, this embodiment being similar to that of FIG. 12 but having nozzle members on opposite sides of the manifold.

FIG. 14 illustrates yet another form of hotrunner system constructed in accordance with the present disclosure, this system being indicated generally at 240. This system can be constructed in a manner similar to the above described hotrunner system 190 shown in FIGS. 12 and 13 except for the differences noted hereinafter. This hotrunner system has a central manifold plate 242, which is mounted in a central air cavity formed by manifold mold plates 244 and 246. The hotrunner molding machine of FIG. 14 has two cavity plates 248, 250, each of which is formed with a plurality of stepped cavities 204. In each cavity is mounted a portion of a nozzle member 206. The manifold mold plates are held against one another and the pressure applied through the two cavity plates.

The manifold plate 242 forms at least one large actuator chamber 252. A pair of pistons 222 are mounted in each large actuator chamber and each of these are connected to the rear end of a respective valve pin 212.

It will be seen that in the embodiment of FIG. 14, unlike that of FIGS. 12 and 13, the nozzle members 206 are mounted on two opposite sides of the manifold, these sides being indicated at 254 and 256. Each nozzle member 206 on one side is aligned in a back-to-back manner with a respective nozzle member on the opposite side and a single large actuator chamber 252 can be provided for each pair of pistons 222 for the aligned nozzle members. Thus, it will be appreciated that the aligned valve pins of each pair of aligned nozzle members move simultaneously between their respective open and closed positions. Alternatively, a separate actuator chamber can be formed in the manifold for each of the pistons 222.

As in the embodiment of FIGS. 12 and 13, in the hotrunner system 240, each valve pin is movable in a longitudinal guide passage 216, which is in the form of a machined bore. A micro gap is formed between each valve pin and its respective machined bore so that, under normal hotrunner system operating conditions, hot melted plastics material in each nozzle member is prevented from passing through the micro gap into the adjacent actuator chamber.

A further detail shown in FIG. 14 is the provision of the additional passage 260 formed in each nozzle member 206 close to the end of the nozzle member that is pressed against the manifold plate. This transverse passage serves the same purpose as the passage 180 in the injection apparatus of FIG. 9. As shown, the additional passage intersects the guide passage 216 and it allows gasses or plastic melt residue that has entered into the guide passage to escape, in other words this passage serves as a decompression bore. Pressurized air in the actuator chamber 252 can pass through the micro gap around the valve pin. Any such escaping air provides self-cleaning of the annular gap that extends between the actuator chamber and the passage 260.

The machined cylindrical wall for each actuator chamber 252 can also be provided with a hardened surface in the manner described above. In particular, the wall of the actuator chamber 214 or 252 can have a machined nitride surface, which is harder than the peripheral wall of the piston. Alternate possible surfaces of the piston and/or the wall of the actuator chamber formed in the manifold plate are surfaces with physical vapour deposition (PVD) or CVD enhancement. Also the cylindrical walls of the actuator chambers in the manifold plate can be impregnated with a high temperature dry lubricant in a manner known per se as explained above.

In the two embodiments shown in FIGS. 12 to 14 the stack height of the manifold and nozzle assembly is more compact and this allows for a more compact injection mold. A reduced mold stack height benefits the opening stroke of the mold for the injection of the plastic part.

Figure 15:
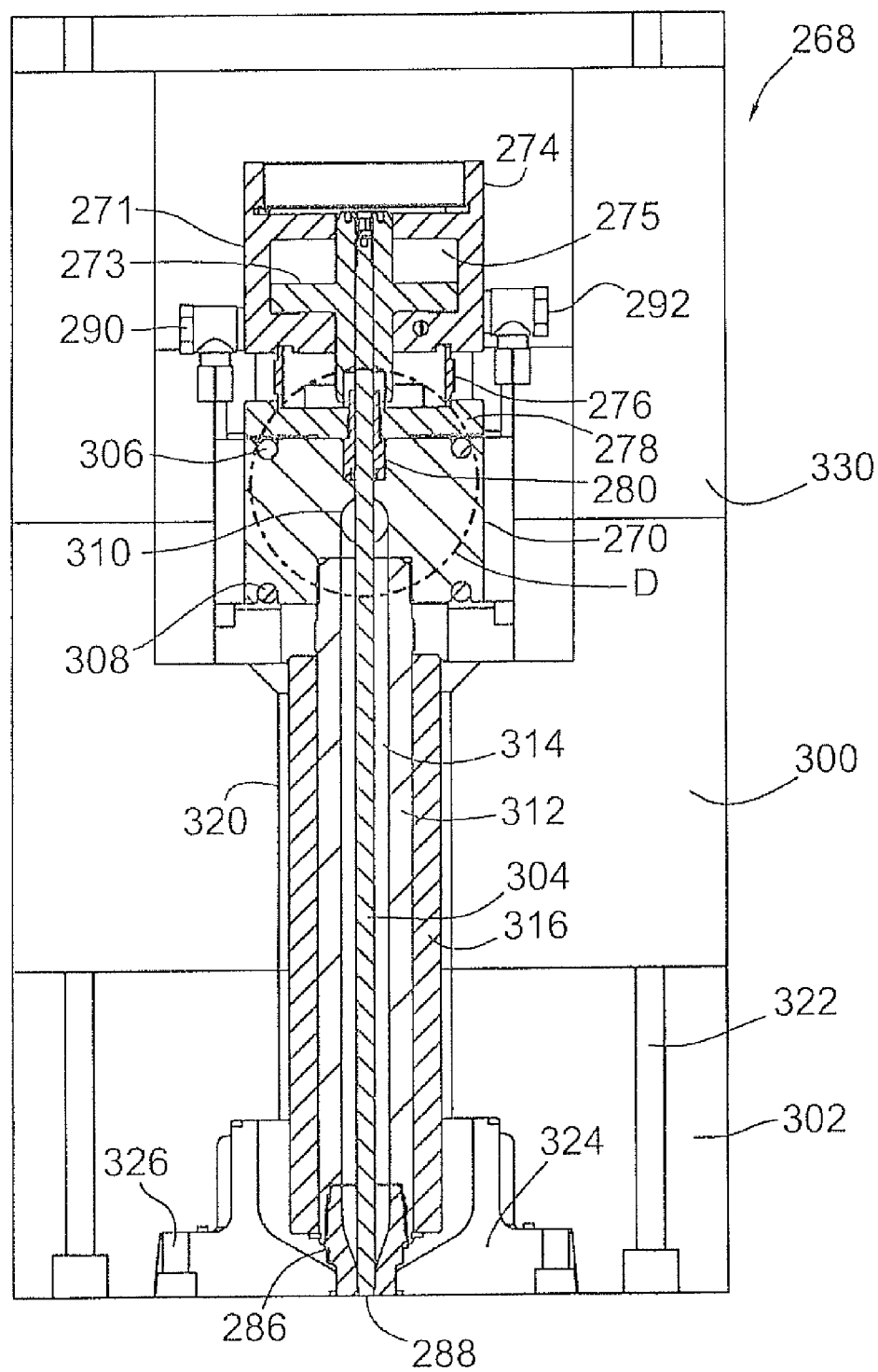
FIG. 15 is a vertical cross-section through another embodiment of a combination of valve gate and manifold, the combination having a top mounted valve pin actuator.
Figure 16:
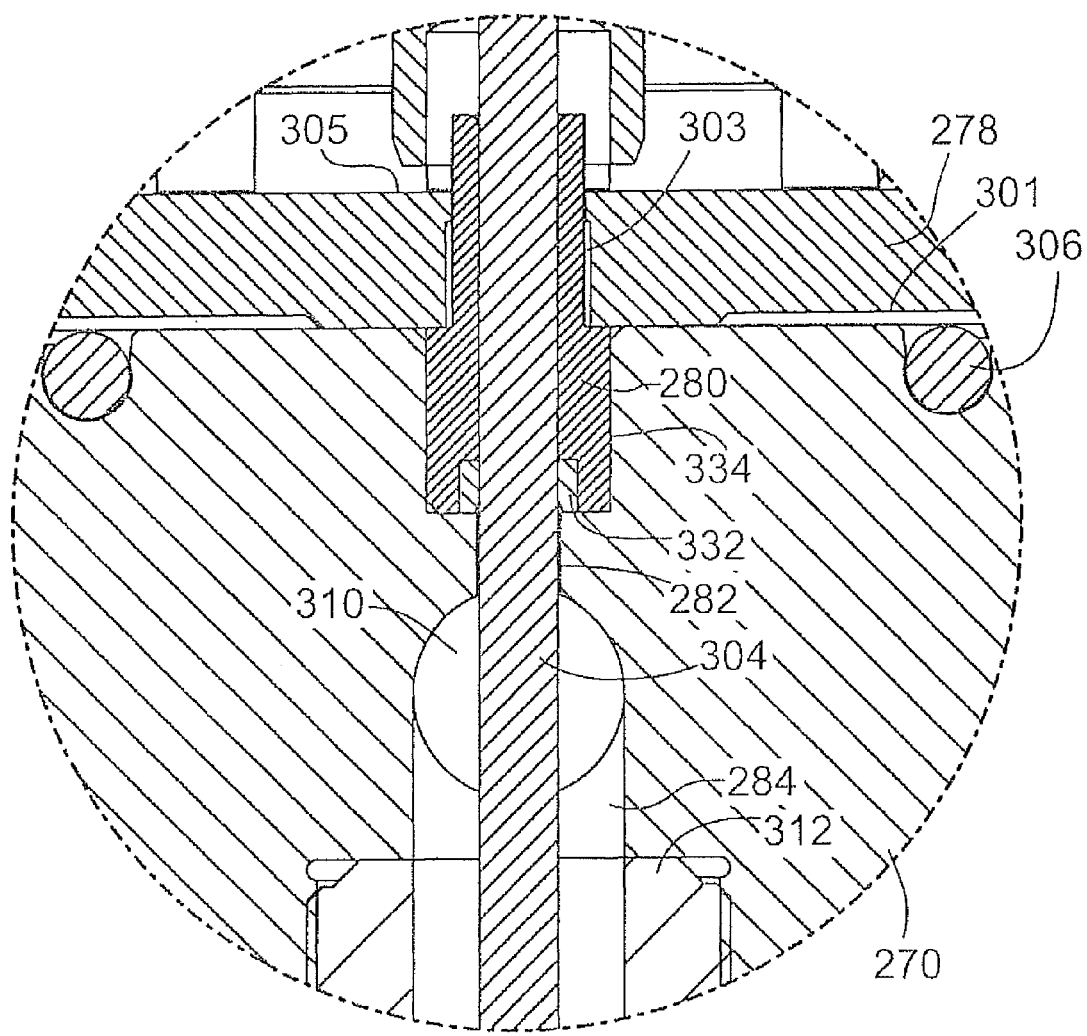
FIG. 16 is a cross-sectional detail view of the circled area D of FIG. 15.

FIGS. 15 and 16 illustrate an alternate form of nozzle valve gate apparatus according to the present disclosure, this apparatus indicated generally by reference 268. The apparatus 268 is for injection hot plastics material into an injection mold (not shown) for molding a plastics product or part. The valve gate apparatus includes an actuator mechanism indicated generally at 271 which per se can be of standard construction and which includes an actuator chamber and a piston slidably mounted in the actuator chamber. A piston 273 is movable by fluid pressure in actuator chamber 275 during use of the valve gate apparatus. It will be understood that because the actuator mechanism is spaced apart from a hotrunner manifold 270 by means of a stand off sleeve 276 and because hot plastics melt does not flow through this standard actuator, the actuator mechanism can be kept at a relatively low temperature and therefore known seals can be provided between the piston and the cylindrical wall of the actuator housing 274. The sleeve creates a thermal barrier between the manifold and the actuator 271. The upper end of the valve pin 304 is connected in a known manner to the actuator piston 273. Visible in FIG. 15 are input/output ports 290, 292 which deliver pressurized air or gas to or from the actuator chamber in order to operate the piston and move the valve pin between its open and closed positions. The valve pin is shown in its closed position in FIG. 15 and, in this position, the injection aperture 288 is closed.

Heaters for the manifold are indicated at 306 and 308 and these are imbedded in the top and bottom surfaces of the manifold. The manifold has a plastics feed conduit 310 that is able to deliver hot plastics melt to a plurality of injection nozzles 312 only one of which is shown. The injection nozzle forms an annular injection passage 314 that extends around the valve pin and that is connected to the feed conduit 310 by a short connecting branch 284 of the feed conduit. Extending around the injection nozzle 312 is a cylindrical nozzle heater 316 similar to the heater 86. The injection nozzle and the heater extend through a passage 320 formed in mold plate 300. Attached to the bottom of the mold plate 300 is a cavity plate 302 which can be detachably connected by means of bolts (not shown) extending through bolt passages 322. Cavities are formed in the plate 302 to accommodate a plurality of annular mold sections 324 only one of which is shown. These sections can each be bolted to the cavity plate by bolts (not shown) extending through bolt holes 326. The nozzle tip 286 is held rigidly in place by the mold section. A cavity for the manifold is formed both by the mold plate 300 and an upper mold plate 330.

The nozzle valve gate apparatus 268 is also provided with an elastomeric wiper seal indicated at 332 (see FIG. 16). This seal is mounted at the bottom end of a wiper seal bushing 280 which can also be described as a retainer. Again this seal extends around and slidably engages the valve pin 304 and the seal is capable of withstanding injection nozzle operating temperatures of at least 200° C. and in one exemplary version temperatures of at least 300° C. It will be seen that in this nozzle valve gate apparatus the seal is mounted in the heatable manifold 270 which is part of the overall injection arrangement. As can be seen from FIG. 16, the wiper seal is separated from the injection passage including the feed conduit 310 and the connecting branch 284 by a machined guide bore indicated at 282. In particularly a micro gap is provided between the valve pin and guide bore 282 and a zero gap is formed between the wiper seal 332 and the valve pin. In an exemplary version of this valve gate apparatus, the micro gap is in the range of 1 to 10 microns and the wiper seal is formed with and contains a lubricating filler. In one embodiment, the wiper seal is made of polyimide and is self lubricating.

As can be seen clearly from FIG. 16, the wiper seal 332 is mounted in a cavity 334 formed in the manifold. In particular the annular bushing or retainer 280 extends into this cavity and is mounted in the cavity in a snug fitting manner. The bushing extends around the circumference of the wiper seal and fixedly holds the seal in the cavity. The bushing also extends through a mounting plate 278 formed with a central hole for the bushing and holding the bushing in place. The plate 278 is attached to the manifold by four screws (not shown). The plate provides a preload on the annular shoulder of bushing 280. The plate also creates an air gap at 301 to provide a thermal barrier. Another annular air gap can be provided at 303 around the upper portion of the bushing 280. The cylindrical hole 305 in the plate 278 can be provided with a diameter slightly greater than the upper section of the bushing which makes insertion of the bushing into the plate easier. However the top part of the hole 305 forms a tight fit with the bushing in order to prevent any movement of the bushing during use.

The machined bore at 282 and the guide pin are partnered and interact to provide a very close cylindrical slide fit with the aforementioned micro gap of 1 to 10 microns. As indicated previously, the hot melt flowing through the manifold can be at high pressure and the moving stroke or the valve pin can be between 5 and 20 mms. In this situation, small amounts of plastic material, gases and melt additives can escape through the micro gap at the bore 282 and, unless remedied, this leaking material can cause mold maintenance, production downtime and plastic part quality issues. Such leaks will over time result in malfunction of the valve pin and the actuator. However, because of the zero gap provided by the wiper seal around the valve pin, no pressurized melt will escape past the wiper seal to the outside of the manifold.

While the present invention has been illustrated and described as embodied in exemplary embodiments, e.g. embodiments having particular utility for injection apparatus and machines for injecting plastics material from a plasticizer unit into an injection mold, it is to be understood that the present invention is not limited to the details shown herein, since it will be understood that various omissions, modifications, substitutions and changes in the forms and details of the disclosed systems and nozzle valve gates and their operation may be made by those skilled in the art without departing in any way from the spirit and scope of the present invention. For example, those of ordinary skill in the art will readily adapt to present disclosure for various other applications without departing from the spirit or scope of the present invention.

I claim:

1. A nozzle valve gate apparatus for delivering and injecting hot plastics material into an injection mold for molding a plastics product or part, said nozzle valve gate apparatus comprising:

a chamber forming body having first passage means for flow of said hot plastics material from a plastics inlet to at least one plastics outlet, said body forming an actuator chamber;

a nozzle part connected to said body and having a longitudinal axis, said nozzle part extending in the longitudinal direction to a nozzle tip having an injection aperture for said hot plastics material to flow into said injection mold, said nozzle part forming second injection passage means operably connected to said at least one plastics outlet for conducting said hot plastics material to said injection aperture and forming a longitudinal guide passage comprising a machined bore;

a valve pin extending through said guide passage and movable therein in the longitudinal direction between an open position at which said hot plastics material can flow through said injection aperture and a closed position which stops flow of the plastics material through the injection aperture;

a piston connected to said valve pin, slidably mounted in said actuator chamber, and adapted to move said valve pin between said open and closed positions by way of fluid pressure in said actuator chamber during use of said valve gate apparatus; and an elastomeric wiper seal extending around and engaging said, valve pin adjacent said machined bore, said wiper seal being made of wear resistant material and being capable of withstanding operating temperatures for said valve gate apparatus of at least 200° C., wherein a micro gap between 1 and 10 microns is formed between said valve pin and said machined bore, and a zero gap is formed between said wiper seal and the valve pin.

2. A nozzle valve gate apparatus according to claim 1 wherein said chamber forming body is provided by a nozzle rear body, said nozzle part is a nozzle shaft detachably connected to one end of said nozzle rear body, a central holding cavity is formed in an end of said nozzle shaft adjacent said nozzle rear body, and said wiper seal is arranged in said central holding cavity.

3. A nozzle valve gate apparatus according to claim 2 wherein said wiper seal is capable of withstanding operating temperatures for said valve gate apparatus of at least 300° C.

4. A nozzle valve gate apparatus according to claim 1 wherein said wiper seal is made of polyimide with a molybdenum disulfide filler.

5. A nozzle valve gate apparatus according to claim 1 wherein said wiper seal is made of PTFE with a boron nitrate filler.

6. A nozzle valve gate apparatus according to claim 1 wherein said wiper seal is a polymer selected from the group consisting of PI, PEI, and PEEK, said polymer containing a friction reducing filler.

7. A nozzle valve gate apparatus according to claim 2 including an annular retainer mounted in the central holding cavity and acting to hold said wiper seal in the central holding cavity.

8. A nozzle valve gate apparatus according to claim 7 wherein said annular retainer is held in the holding cavity by a set screw and a further wiper seal is held in said retainer by said set screw.

9. A hotrunner system for injecting plastics material into an injection mold, said system comprising:

a hotrunner manifold having an inlet for receiving melted plastics material and a plastics feed conduit connected to said inlet, said manifold being adapted for operation at a desired elevated temperature suitable for flow of said melted plastics material through said manifold;

a plurality of injection apparatus operatively connected to respective outlets of said feed conduit, each injection apparatus having
  (i) a nozzle device having a longitudinal axis and a longitudinal injection passage extending to a nozzle tip,
  an elongate valve pin extending through a machined guide bore formed in said nozzle device and movable in the bore between an open position at which said melted plastics can flow from the nozzle tip into the injection mold and a closed position to stop the flow of said plastics materials from the nozzle tip, and
  (iii) a piston connected to an end of the valve pin, slidably mounted in an actuator chamber formed in the nozzle device, and adapted to move said valve pin between said open and closed pistons by way of fluid pressure in said actuator chamber during use of the hotrunner system, and
  an elastomeric wiper seal extending around and engaging said valve pin adjacent said guide bore, said wiper seal providing a zero gap between the wiper seal and the valve pin and being capable of withstanding operating temperatures for its respective injection apparatus of at least 200° C., wherein a micro gap ranging between 1 and 10 microns is formed between said valve pin and said guide bore.

10. A hotrunner system according to claim 9 wherein each nozzle device comprises a nozzle rear body and a nozzle shaft connected to one end of said nozzle rear body, a central seal cavity is formed in a rear end of said nozzle shaft adjacent said nozzle rear body, and said wiper seal is fixedly arranged in said seal cavity.

11. A hotrunner system according to claim 10 wherein each wiper seal is capable of withstanding operating temperatures for its respective injection apparatus of at least 300° C.

12. A hotrunner system according to claim 9 wherein each wiper is made of polyimide with a molybdenum disulfide filler.

13. A hotrunner system according to claim 9 wherein said wiper seal is a polymer selected from the group consisting of PI, PEI, and PEEK, said polymer containing a friction reducing filler.

14. A hotrunner system according to claim 10 including an annular retainer member mounted in the central seal cavity and holding said wiper seal in said central seal cavity.

15. A hotrunner system according to claim 14 wherein said retainer member is held in said central seal cavity by a set screw threaded into the seal cavity and a further wiper seal is mounted in said retainer member.

16. A nozzle valve gate apparatus for injecting hot plastics material into an injection mold for molding a plastics product or part, said nozzle valve gate apparatus comprising:

an actuator mechanism having an actuator chamber and a piston slidably mounted in said actuator chamber and movable therein by fluid pressure in said actuator chamber during use of said valve gate apparatus;

an injection arrangement including an injection nozzle having a longitudinal axis and extending in the longitudinal direction to a nozzle tip having an injection aperture for said hot plastics material to flow into said injection mold, said injection nozzle forming an injection passage for conducting said hot plastics materials from at least one inlet of the injection arrangement to said injection aperture, said injection arrangement having a machined guide bore extending in the longitudinal direction, a valve pin extending through said guide bore and movable therein to open or close said injection aperture, said valve pin being connected to said piston and movable thereby, and an elastomeric wiper seal extending around and slidably engaging said valve pin, said wiper seal being capable of withstanding injection nozzle operating temperatures of at least 200° C., being mounted in said injection arrangement adjacent said guide bore, and being separated from said injection passage by at least a section of said guide bore, wherein a micro gap is provided between the valve pin and at least said section of the guide bore and a zero gap is formed between said wiper seal and the valve pin.

17. A nozzle valve gate apparatus according to claim 16 wherein said injection arrangement includes a heatable manifold connected to an end of said injection nozzle located furthest from the nozzle tip, said guide bore is formed in the manifold, and the wiper seal is mounted in a cavity formed in said manifold.

18. A nozzle valve gate apparatus according to claim 17 including an annular retainer member mounted in said cavity and fixedly holding said wiper seal in said cavity.

19. A nozzle valve gate apparatus according to claim 17 wherein said actuator mechanism and said injection nozzle are mounted on opposite sides of said manifold, said micro gap is in the range of 1 to 10 microns, and said wiper seal is formed with and contains a lubricating filler.

20. A nozzle valve gate apparatus according to claim 16 wherein said wiper seal is made of polyimide and is self-lubricating.

21. A nozzle valve gate apparatus according to claim 16 wherein said wiper seal is a polymer selected from the group consisting of PI, PEI, and PEEK, said polymer containing a friction reducing filler.

22. A nozzle valve gate apparatus according to claim 18 wherein said injection arrangement includes a mounting plate mounted between said manifold and said actuator mechanism, a portion of said retainer member is mounted in a hole formed in the mounting plate, and said mounting plate secures another portion of said retainer member in said cavity.

23. A hotrunner system for injecting plastics material into an injection mold for molding plastics devices or parts, said system comprising:

a hotrunner manifold having an inlet for receiving melted plastics material and a plastics feed conduit connected to said inlet, said manifold being adapted for operation at a desired elevated temperature suitable for flow of said melted plastics material through said manifold without undesirable degradation, said manifold forming actuator chambers;

a plurality of nozzle members mounted on at least one side of said manifold and each having a longitudinal axis, each nozzle member having an injection passage operatively connected to a respective outlet of said feed conduit and extending to a nozzle tip and having a longitudinal guide passage formed therein, each guide passage comprising a machined bore;

a plurality of elongate valve pins each extending through a respective one of the guide passages and movable therein between an open position at which said melted plastics material can flow from the respective nozzle tip into the injection mold and a closed position which stops flow from the nozzle tip, a micro gap being formed between each valve pin and its respective machined bore, said micro gap under normal hotrunner system operating conditions helping to prevent hot melted plastics material in the respective nozzle member from passing through the micro gap into the adjacent actuator chamber;

elastomeric wiper seals each extending around a respective one of said valve pins adjacent its respective machined bore, said wiper seals being made of wear resistant material and being capable of withstanding operating temperatures of at least 200° C., wherein a zero gap is formed between each wiper seal and its respective valve pin; and a plurality of pistons each connected to a rear end of a respective one of the valve pins, slidably mounted in an associated one of the actuator chambers, and adapted to move its respective valve pin between said open and closed positions by way of fluid pressure in the associated actuator chamber.

24. A hotrunner system according to claim 23 wherein said nozzle members are mounted on two opposite sides of said manifold and the or each nozzle member on one side is aligned in a back-to-back manner with a respective nozzle member on the opposite side and each aligned pair of nozzle members is associated with one of the actuator chambers and aligned therewith in the longitudinal direction of the nozzle members, the one actuator chamber containing two pistons, one for each of the nozzle members of the aligned pair.

25. A hotrunner system according to claim 23 wherein each valve pin actuator is a pneumatic actuator and gas bores are formed in said hotrunner manifold for delivering pressurized air or gas to or from each actuator chamber.

26. A hotrunner system according to claim 23 wherein each nozzle member is formed with a transversely extending additional passage that intersects the machined bore of the nozzle member at a location spaced from the adjacent actuator chamber, said additional passage allowing any gases on plastics melt residue that has entered the machined bore to escape.

27. A hotrunner system according to claim 23 wherein said pistons and cylindrical walls of the manifold forming said actuator chambers are machined to close tolerances so as to form a micro gap between a peripheral wall of each piston and the adjacent cylindrical wall of the associated actuator chamber.

28. A hotrunner system according to claim 23 wherein the cylindrical wall of each actuator chamber has a machined nitride surface which is harder than said peripheral wall of the associated piston.

* * * * *